US008189080B2

(12) United States Patent
Ali et al.

(10) Patent No.: US 8,189,080 B2
(45) Date of Patent: May 29, 2012

(54) ORIENTATION-BASED APPROACH FOR FORMING A DEMOSAICED IMAGE, AND FOR COLOR CORRECTING AND ZOOMING THE DEMOSAICED IMAGE

(75) Inventors: Gazi Ali, Santa Clara, CA (US); Ming-Chang Liu, San Jose, CA (US); Ximin Zhang, San Jose, CA (US)

(73) Assignees: Sony Corporation, Manato-Ku, Tokyo (JP); Sony Electronics Inc., Park Ridge, NJ (US)

( * ) Notice: Subject to any disclaimer, the term of this patent is extended or adjusted under 35 U.S.C. 154(b) by 431 days.

(21) Appl. No.: 12/418,207

(22) Filed: Apr. 3, 2009

(65) Prior Publication Data

US 2010/0253817 A1 Oct. 7, 2010

(51) Int. Cl.
*H04N 3/14* (2006.01)
*G06K 9/00* (2006.01)
(52) U.S. Cl. ........................................ 348/271; 382/162
(58) Field of Classification Search .......... 348/271–275; 382/167, 300
See application file for complete search history.

(56) References Cited

U.S. PATENT DOCUMENTS

| 4,164,788 | A | 8/1979 | Jain |
| 6,154,519 | A | 11/2000 | Florent et al. |
| 6,836,289 | B2 | 12/2004 | Koshiba et al. |
| 6,933,970 | B2 | 8/2005 | Koshiba et al. |
| 7,199,824 | B2 * | 4/2007 | Chang et al. ................. 348/246 |
| 7,542,082 | B2 * | 6/2009 | Tajima et al. ................. 348/246 |
| 7,855,741 | B2 * | 12/2010 | Moon et al. ................... 348/273 |
| 2002/0186309 | A1 * | 12/2002 | Keshet et al. ................. 348/272 |
| 2003/0059126 | A1 * | 3/2003 | Kim et al. .................... 382/300 |
| 2006/0279585 | A1 | 12/2006 | Milanfar et al. |

(Continued)

FOREIGN PATENT DOCUMENTS

EP 0644686 A2 3/1995

(Continued)

OTHER PUBLICATIONS

Wu et al., Primary-Consistent Soft-decision Color Demosaic for Digital Cameras, Department of Electrical and computer Engineering; McMaster University; pp. I-477 to I-480.

(Continued)

*Primary Examiner* — Trung Diep
(74) *Attorney, Agent, or Firm* — Moser Taboada

(57) ABSTRACT

A method and apparatus for forming a demosaiced image from a color-filter-array ("CFA") image is provided. The CFA image comprises a first set of pixels colored according to a first (e.g., a green) color channel, a second set of pixels colored according to a second (e.g., a red) color channel and a third set of pixels colored according to a third (e.g., blue) color channel. The method may include obtaining an orientation map, which includes, for each pixel of the color-filter-array image, an indicator of orientation of an edge bounding such pixel. The method may further include interpolating the first color channel at the second and third sets of pixels as a function of the orientation map so as to form a fourth set of pixels. The method may also include interpolating the second color channel at the first and third sets of pixels as a function of the orientation map and the fourth set of pixels; and interpolating the third color channel at the first and second sets of pixels as a function of the orientation map and the fourth set of pixels.

32 Claims, 6 Drawing Sheets

U.S. PATENT DOCUMENTS

2007/0035636 A1* 2/2007 Wu .............................. 348/223.1
2010/0166334 A1* 7/2010 Zhang et al. .................. 382/263

FOREIGN PATENT DOCUMENTS

| EP | 0670528 A2 | 9/1995 |
| EP | 1111904 A2 | 6/2001 |
| JP | 2003018398 A2 | 1/2003 |
| JP | 20050270761 A2 | 1/2005 |

OTHER PUBLICATIONS

Grossman et al., "An Efficient Method for Demosaicing", Department of Electrical Engineering Technion—Israel Institute of Technology; pp. 436-439.

Lu (Student Member, IEEE) and Tan (Member, IEEE), "Color Filter Array Demosaicking: New Method and Performance Measures"; pp. 1194-1210.

Yuk et al., "Soft-Decision Color Demosaicking With Direction Vector Selection"; Department of Electronic and Computer Engineering; The Hong Kong University of Science and Technology; pp. 449-452.

Lian et al., "An Efficient and Effective Color Filter Array Demosaicking Method"; School of Electrical and Electronic Engineering; Nanyang Technological University, Singapore; pp. IV-225 to IV-228.

Gotoh, Tomomasa et al., "Direct Super-Resolution and Registration Using RAW CFA Images," Proceedings of the 2004 IEEE Computer Society Conference on Computer Vision and Pattern Recognition (CVPR'04), vol. 2, Issue 27, Jun. 27-Jul. 2, 2004, pp. II-600-II-607.

Park, Sung Cheol et al., "Super-Resolution Image Reconstruction: A Technical Overview," IEEE Signal Processing Magazine, May 2003, pp. 21-36.

Gunturk, Bahadir K. et al., "Color Plane Interpolation Using Alternating Projections," IEEE Transactions on Image Processing, vol. 11, No. 9, Sep. 2002, pp. 997-1013.

Hirakawa, Keigo et al., "Adaptive Homogeneity-Directed Demosaicing Algorithm," IEEE Transactions on Image Processing, vol. 14, No. 3. Mar. 2005, pp. 360-369.

* cited by examiner

ORIENTATION-BASED APPROACH FOR FORMING A DEMOSAICED IMAGE, AND FOR COLOR CORRECTING AND ZOOMING THE DEMOSAICED IMAGE

BACKGROUND

1. Field

Embodiments of the present invention generally relate to demosaicing of images, and more particularly, to a method and apparatus for forming a demosaiced image from a color-filter-array ("CFA") image, and for performing color correction and/or a digital zoom to such demosaiced image.

2. Related Art

Today's image capturing devices, such as digital cameras, camcorders, mobile phones, smart phones, Personal Digital Assistants ("PDA") and any other like-type device, each include an imaging module that can be used to capture a number or sequence of images (each a "captured image"). To facilitate this, the imaging module includes an image sensor, which in turn, includes a array of elements or pixels (collectively "pixels"); and a color filter array ("CFA") overlaying the array of pixels.

Typically, the CFA includes pluralities of red, green and blue ("RGB") optical filters; one for each pixel in the array of pixels. The CFA is generally arranged in a mosaic pattern ("CFA mosaic pattern") in which each of the RGB optical filters is not the same color as the RGB optical filters that are vertically or horizontally adjacent. The CFA-mosaic pattern may be defined, for example, so that all odd (i.e., first, third, fifth, etc.) rows of the pixels in the array are overlaid by an alternating pattern of green and red optical filters ("alternating-GR filters"), and all even (i.e., second, fourth, sixth, etc.) row of the pixels in the array are overlaid by an alternating pattern of blue and green optical filters ("alternating-BG filters").

The array of pixels are adapted to (i) sense, through the CFA, energy corresponding to luminescence associated with a scene (i.e., the captured image), (ii) convert such energy into respective electrical charges having electrical potentials corresponding to the luminescence, and (iii) store such charges ("stored charges"). Through scaling, the image sensor makes the stored charges represent respective bytes of digital data; which have respective values proportional to the luminescence sensed by such pixels. The bytes of digital data that correspond to the entire captured image are commonly referred to as RAW and/or CFA (collectively "RAW") data.

The image sensor typically outputs the RAW data responsive to a control signal, such as a signal to capture another image. This RAW data, as such, represents the CFA mosaic pattern. As a result, the RAW data does not represent a full color image. This is because the RAW data does not include data for all RGB planes at each of the pixels. That is, the RAW data is missing data for (i) red and blue channels at the pixels overlaid with green optical filters; (ii) red and green channels as at the pixels overlaid with blue optical filters; and (iii) and green and blue channels at pixels overlaid with red optical filters.

Legacy image-processing devices (which may be part of or completely separate from the aforementioned image capturing devices) use demosaicing to estimate missing color channels based on the RAW data. To carry out demosaicing, a legacy image-processing device typically applies, for each of the color planes, a bicubic interpolation to the RAW data. This causes the legacy image-processing device to interpolate each of the pixels using color channel information in the RAW data for pixels neighboring such pixel.

However, an image rendered from demosaicing ("demosaiced image") usually has colors not originally present in scene captured by the image sensor ("false colors"). To reduce false colors, the legacy image-processing device may filter the already demosaiced image using one or more low-pass filters. Unfortunately, such filtering typically causes the demosaiced image to suffer from a blurring effect and other artifacts.

SUMMARY

A method and apparatus for forming a demosaiced image from a color-filter-array ("CFA") image is provided. The CFA image comprises a first set of pixels colored according to a first (e.g., a green) color channel ("first-CFA-color-pixel set"), a second set of pixels colored according to a second (e.g., a red) color channel ("second-CFA-color-pixel set") and a third set of pixels colored according to a third (e.g., blue) color channel ("third-CFA-color-pixel set"). The method may include obtaining an orientation map, which includes, for each pixel of the color-filter-array image, an indicator of orientation of an edge bounding such pixel. The method may further include interpolating the first color channel at the second-CFA-color-pixel and third-CFA-color-pixel sets as a function of the orientation map so as to form a fourth set of pixels ("interim-pixel set"). The method may also include interpolating the second color channel at the first-CFA-color-pixel and third-CFA-color-pixel sets as a function of the orientation map and the interim-pixel set; and interpolating the third color channel at the first-CFA-color-pixel and second-CFA-color-pixel sets as a function of the orientation map and the interim-pixel set.

The indicator of orientation may be indicative of an orientation of the edge at any of a horizontal, vertical, forty-five degree, one-hundred-thirty-five degree, and a flat orientation. And the interim-pixel set may include first, second and third subsets of pixels. The first subset of pixels may be colored according to the second color channel and an estimate of the first color channel ("first/second-color-pixel set"). The second subset of pixels may be colored according to the third color channel and an estimate of the first color channel ("first/third-color-pixel set"). The third subset of pixels is the first-CFA-color-pixel set.

Interpolating the first color channel may include, for example, obtaining, from the orientation map, for at least one first pixel of any of the second-CFA-color-pixel and third-CFA-color-pixel sets, a first indicator of orientation of an edge bounding such at least one pixel ("first orientation indicator"). Interpolating the first color channel may also include selecting, as a function of the first orientation indicator, a first filter for estimating the first color channel at the first pixel. Interpolating the first color channel may further include applying, at the first pixel, the first filter to estimate the first color channel at such first pixel. To facilitate interpolating the first color channel, the first filter may be, for example, adapted to estimate the first color channel at the first pixel as a function of a first gradient formed from at least one of the first-CFA-color-pixel set disposed in the edge bounding the first pixel. This first filter may, for example, include at least one coefficient defined as a function of the first orientation indicator.

Interpolating the second color channel may include, for example, obtaining, from the orientation map, for at least one second pixel of the first set of pixels, a second indicator of orientation of an edge bounding such second pixel ("second orientation indicator"). Interpolating the second color channel may also include selecting, as a function of the second orientation indicator, a second filter for estimating the second channel at the second pixel; and applying, at the second pixel, the second filter to estimate the second color channel at the second pixel. Interpolating the second color channel may further include (i) obtaining, from the orientation map, for at least one third pixel of the second subset of pixels, a third indicator of orientation of an edge bounding such third pixel ("third orientation indicator"); (ii) selecting, as a function of the third orientation indicator, a third filter for estimating the second color channel at the third pixel; and (iii) applying, at the third pixel, the third filter to estimate the second color channel at the third pixel.

To facilitate interpolating the second color, the second filter may be adapted to estimate the second color channel at the second pixel as a function of a second gradient. This second gradient may be formed from at least one of the first/second-color-pixel set disposed in the edge bounding the second pixel. In addition, the third filter may be adapted to estimate the second color channel at the third pixel as a function of a third gradient. This third gradient may be formed from at least one of the first/second-color-pixel set disposed in the edge bounding the third pixel.

Interpolating the third color channel may include, for example, obtaining, from the orientation map, for at least one fourth pixel of the first set of pixels, a fourth indicator of orientation of an edge bounding such second pixel ("fourth orientation indicator"). Interpolating the third color channel may also include selecting, as a function of the fourth orientation indicator, a fourth filter for estimating the third channel at the fourth pixel; and applying, at the fourth pixel, the fourth filter to estimate the third color channel at the fourth pixel. Interpolating the third color channel may further include (i) obtaining, from the orientation map, for at least one fifth pixel of the first subset of pixels, a fifth indicator of orientation of an edge bounding such fifth pixel ("fifth orientation indicator"); (ii) selecting, as a function of the fifth orientation indicator, a fifth filter for estimating the third color channel at the fifth pixel; and (iii) applying, at the fifth pixel, the fifth filter to estimate the third color channel at the fourth pixel.

To facilitate interpolating the third color, the fourth filter may be adapted to estimate the third color channel at the fourth pixel as a function of a fourth gradient. This fourth gradient may be formed from at least one of the first/third-color-pixel set disposed in the edge bounding the fourth pixel. In addition, the fifth filter may be adapted to estimate the third color channel at the fifth pixel as a function of a fifth gradient. The fifth gradient may be formed from at least one of the first/third-color-pixel set disposed in the edge bounding the fifth pixel.

BRIEF DESCRIPTION OF THE DRAWINGS

So the manner in which the above recited features are attained and can be understood in detail, a more detailed description is described below with reference to Figures illustrated in the appended drawings.

The Figures in the appended drawings, like the detailed description, are examples. As such, the Figures and the detailed description are not to be considered limiting, and other equally effective examples are possible and likely. Furthermore, like reference numerals in the Figures indicate like elements, and wherein.

DETAILED DESCRIPTION

In the following detailed description, numerous specific details are set forth in order to provide a thorough understanding of examples described herein. However, it will be understood that these examples may be practiced without the specific details. In other instances, well-known methods, procedures, components and circuits have not been described in detail, so as not to obscure the following description. Further, the examples disclosed are for exemplary purposes only and other examples may be employed in lieu of or in combination with of the examples disclosed.

Example Architecture

Figure 1:
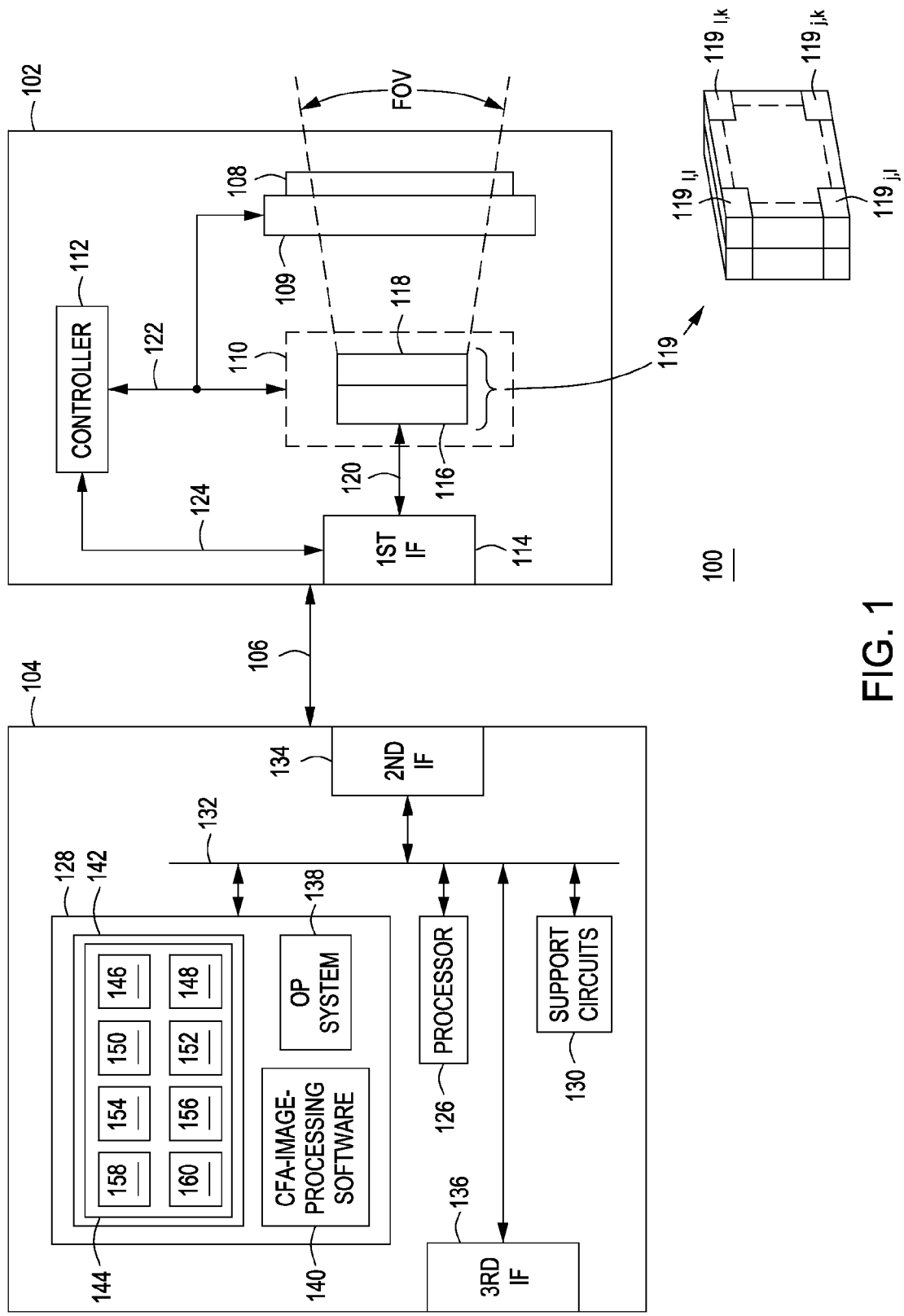
FIG. 1 is a block diagram illustrating an example system for forming a demosaiced image from a color-filter-array ("CFA") image.

FIG. 1 is a block diagram illustrating an example system 100 for forming a demosaiced image from a color-filter-array ("CFA") image. The system 100 may be any computing device, system and the like, and may be formed in a single unitary device and concentrated on a single server, client, peer or other type node. Alternatively, the system 100 may be formed from one or more separate devices, and as such, may be distributed among a number of server, client, peer or other type nodes. In addition, the system 100 may be scalable (i.e., may employ scale-up and/or scale-out approaches).

The system 100 may include a large number of elements; many of which are not shown for simplicity of exposition. As shown in FIG. 1, the system 100 includes an imaging device 102 and a processing platform 104, which may be communicatively coupled via link 106.

In accordance with above, the imaging device 102 may be a stand-alone device, such as a digital (still and/or video) camera. Alternatively, imaging device 102 may be included within or communicatively coupled as an accessory to any of a digital (still and/or video) camera, personal computer; portable computer, handheld computer; mobile phone, digital assistant, personal digital assistant, cellular phone, smart phone, pager, digital tablet, laptop computer, Internet appliance and the like.

The imaging device 102 is operable to capture within its field of view ("FOV") at least one image ("imaging-device image") of a scene at a given resolution ("imaging-device resolution"), and provide such imaging-device image to the processing platform 102 via the link 106. To facilitate capturing the imaging-device image, the imaging device 102 may include a lens 108, a shutter 109, an imaging module 110, a controller 112 and a first input/output ("I/O") interface 114. The lens 108 may include any type of optics capable of focusing the scene for capture by the imaging module 110.

The imaging module 110 may include an image sensor 116, such as a charge-couple device and/or CMOS device. The image sensor, in turn, includes an array of pixels, and a color filter array ("CFA") 118 overlaying such array of pixels (collectively "CFA-pixel array" 119). The CFA-pixel array 119, as shown in exploded view, includes pixels $119_{1,1}$ ... $119_{j,k}$ that are arranged in j rows and k columns. The pixels $119_{1,1}$ ... $119_{j,k}$ may, for example, range from a hundred to twenty million. The pixels $119_{1,1}$ ... $119_{j,k}$, however, may be less than a hundred or greater than twenty million.

The number of the pixels $119_{1,1} \ldots 119_{j,k}$ defines the imaging-device resolution. In practice, the imaging-device resolution is typically less than the number of pixels $119_{1,1} \ldots 119_{j,k}$. This may be attributed to (i) the CFA-pixel array having one or more of the pixels $119_{1,1} \ldots 119_{j,k}$ that are inoperative, malfunctioning or otherwise not in use, and/or (ii) the CFA 118 causing one or more of the pixels to be inoperative, malfunction or otherwise not be use.

The CFA 118 may include pluralities of three different colored optical filters, namely, first, second and third colored filters; one for each of the pixels $119_{1,1} \ldots 119_{j,k}$. The CFA 118 may be, for example, a Bayer filter, which has a given mosaic pattern. This mosaic pattern defines that (i) the first-colored filters overlay the pixels $119_{1,1} \ldots 119_{j,k}$ disposed at intersections of all odd numbered (i.e., first, third, fifth, etc.) rows and columns and at intersections of even numbered (i.e., second, fourth, sixth, etc.) rows and columns (i.e., j and k are both odd or even), (ii) the second-colored filters overlay the pixels $119_{1,1} \ldots 119_{j,k}$ disposed at intersections of all odd numbered rows and all even numbered columns (i.e., j is odd and k is even), and (iii) the third-colored filters overlay the pixels $119_{1,1} \ldots 119_{j,k}$ disposed at intersections of all even numbered rows and all odd numbered columns (i.e., j is even and k is odd). The mosaic pattern may take other forms as well. In addition, the CFA 118 may include more, less or different colored optical filters, such as a CYGM filter, which includes cyan, yellow, green and magenta optical filters, and/or an RGBE filter, which includes red, green, blue and emerald optical filters.

The CFA-pixel array may be adapted to (i) sense, through the CFA 118, energy corresponding to luminescence associated with the scene in the imaging-device image, (ii) convert such energy into respective electrical charges having electrical potentials corresponding to the luminescence, and (iii) store the charges ("stored charges"). The image sensor 116 or other component of the imaging module 110 (not shown) may scale the stored charges.

The image sensor 116 or other component of the imaging module 110 (not shown) may form, as a function of the stored charges for the imaging-device image (i.e., a CFA image), at least one set of RAW data. The set of RAW data represents, numerically, the CFA image at the imaging-device resolution.

The image sensor 116 or other component of the imaging module 110 (not shown) may also output the set of RAW data for transfer to the first I/O interface 114. To facilitate the transfer of the set of RAW data to the first I/O interface 114, the imaging device 102 may include a ("first internal") link 120 communicatively coupling the imaging module 110 and the first I/O interface 114. The first internal link 120 may include one or more linkable segments. These linkable segments may be disposed in one or more wired and/or wireless communication networks and/or one or more electrical busses.

The imaging device 102 may also include two other links, namely, second and third internal links 122, 124. The second and third internal links 122, 124 communicatively couple the controller 112 to (i) the imaging module 110 and shutter 109, and (ii) the first I/O interface 114, respectively. Like the first internal link 120, the second and third internal links 122, 124 may include one or more linkable segments, which may be disposed in one or more wired and/or wireless communication networks and/or one or more electrical busses.

The controller 112 may include logic (not shown) for controlling operation of the imaging device 102. This logic may, for example, provide one or more signals ("capture signals") via a second internal link 122 to cause the shutter 109 to open and/or close, and to cause the image sensor 116 to capture the imaging-device image. The logic may provide the capture signals at a first given frequency. The first given frequency may be periodic, cyclic and/or episodic.

The logic may also provide one or more signals ("sequencing-control signals") to the image sensor 116 or other component of the imaging module 110, via the second internal link 122, to cause the CFA-pixel array output the set of RAW data at a second given frequency. The second given frequency may be periodic, cyclic and/or episodic, and may be the same or different from the first given frequency.

The logic may further provide one or more signals ("first-interface-control signals") to the first I/O interface 114, via the third internal link 124, to cause the first I/O interface 114 to output to the link 106 the set of RAW data present in the first I/O interface 114. The logic may provide the first-interface-control signals at a third given frequency. The third given frequency may be periodic, cyclic and/or episodic, and may be the same or different from any of the first and second given frequencies.

To facilitate communicatively coupling the imaging device 102 and the processing platform 104, the link 106 may include one or more linkable segments. These linkable segments may be disposed in one or more wired and/or wireless communication networks and/or one or more electrical busses.

The processing platform 104 may be or be included within, for example, any of or any combination of a personal computer; a portable computer, a handheld computer; a mobile phone, a digital assistant, a personal digital assistant, a cellular phone, a smart phone, a pager, a digital tablet, a laptop computer, an Internet appliance and the like. In general, the processing platform 104 includes a processor-based platform that operates on any suitable operating system, such as Microsoft® Windows®, Apple OSX, Unix, Linux and/or Symbian; and that is capable of executing software.

The processing platform 104 may, however, include a large number of elements; many of which are not shown in FIG. 1 for simplicity of exposition. As shown in FIG. 1, the processing platform 104 may include one or more processing units (collectively "processor") 126, memory 128, support circuits 130, bus 132, and second and third I/O interfaces 134, 136.

The processor 126 may be one or more conventional processors, microprocessors, multi-core processors and/or microcontrollers. The bus 132 provides for transmissions of digital information among the processor 126, memory 128, support circuits 130, second and third I/O interfaces 134, 136 and other portions of the processing platform 104 (not shown). The support circuits 130 facilitate operation of the processor 126, and may include well-known circuitry or circuits, including, for example, one or more I/O interfaces; one or more network interface units ("NIUs"); cache; clock circuits; power supplies and the like.

The second I/O interface 134 provides an interface to control the transmissions of digital information between components of processing platform 104 (shown and not shown) and between the processing platform 104 and the imaging device 102. To facilitate this, the second I/O interface 134 may include one or more NIUs for facilitating an exchange of information via the link 106. Accordingly, these NIUs may be adapted for communicating in accordance with one or more protocols of wired, wireless, satellite, and/or optical communications, including, for example, Ethernet and SONET protocols.

Like the second I/O interface 134, the third I/O interface 136 provides an interface to control the transmissions of digital information between components of processing platform 104 (shown and not shown). The third I/O interface 136 also provides an interface to control transmission of digital information between the processing platform 104 and other devices (not shown). To facilitate this, the third I/O interface 136 may include one or more NIUs for facilitating an exchange of information with such other devices. The NIUs may be adapted for communicating in accordance with one or more protocols of wired, wireless, satellite, and/or optical communications, including, for example, Ethernet and SONET protocols.

In addition, the third I/O interface 136 provides an interface to control the transmissions of digital information between I/O devices (not shown) associated with or otherwise attached to the processing platform 104. These I/O devices (not shown) may be embodied as any of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) a pointing device, such as a mouse, joystick, trackball, touchpad, pointing stick, light pen, head pointer, soap mouse, eye tracking devices, digitizing tablet and stylus, data glove that translates the user's movements to computer gestures; and a key-in device, such as a keyboard or a touchpad, (vii) and the like.

The memory 128 may be or employ any of random access memory, read-only memory, optical storage, magnetic storage, removable storage, erasable programmable read only memory and variations thereof, content addressable memory and variations thereof, flash memory, disk drive storage, removable storage and the like. The memory 128 may store and receive queries from the processor 126 to obtain various software packages to be executed by the processor 126. These software packages may include an operating system 138 and CFA-image-processing software 140.

The memory 128 may store in one or more records 142 and/or receive requests from the processor 126 to obtain, from such records 142, one or more operands, operators, dimensional values, configurations, parameters and/or other data (collectively "information") that may be used by any of the operating system 138 and CFA-image-processing software 140 to control the operation of and/or facilitate performing the functions of the processing platform 104. The records 142 may include a data store 144. This data store 144 may include a copy of the set of RAW data ("RAW-data set") 146, an orientation map 148, a first-interim-data set 150, a second-interim-data set 152, a third-interim-data set 154, a fourth-interim-data set 156, an interpolated-data set 158, and a zoom-data set 160 (collectively "data sets").

The RAW-data set 146 includes a number of data points ("RAW-data points"). These RAW-data points may be arranged in any number of ways. For simplicity of exposition, the RAW-data points map to the pixels $119_{1,1} \ldots 119_{j,k}$ on a one-to-one basis. For example, the RAW-data set 146 may be represented as:

$$RAW\text{-data set } 146 = \begin{Bmatrix} a_{1,1} & \cdots & a_{1,k} \\ \vdots & \ddots & \vdots \\ a_{j,1} & \cdots & a_{j,k} \end{Bmatrix} \quad (1)$$

where: RAW-data points $a_{1,1} \ldots a_{j,k}$ map to and numerically represent the pixels $119_{1,1} \ldots 119_{j,k}$, respectively.

As described in more detail below, the CFA-image-processing software 140 may use, form, populate, revise, etc. the data sets to facilitate forming the demosaiced image. Like the RAW-data set 146, the first-interim-data set 150, second-interim-data set 152, third-interim-data set 154, fourth-interim-data set 156, and interpolated-data set 158 include respective sets of data points. Each of these data points may map to and numerically represent the pixels $119_{1,1} \ldots 119_{j,k}$, respectively, after respective stages of interpolation carried out by the CFA-image-processing software 140.

The first-interim-data set 150, for example, may be represented as:

$$\text{first-interim-data set } 150 = \begin{Bmatrix} b_{1,1} & \cdots & b_{1,k} \\ \vdots & \ddots & \vdots \\ b_{j,1} & \cdots & b_{j,k} \end{Bmatrix} \quad (2)$$

where: the first-interim-data points $b_{1,1} \ldots b_{j,k}$, map to and numerically represent the pixels $119_{1,1} \ldots 119_{j,k}$, respectively, after a first stage of interpolation. The second-interim-data set 152 may be represented as:

$$\text{second-interim-data set } 152 = \begin{Bmatrix} c_{1,1} & \cdots & c_{1,k} \\ \vdots & \ddots & \vdots \\ c_{j,1} & \cdots & c_{j,k} \end{Bmatrix} \quad (3)$$

where: the second-interim-data points $c_{1,1} \ldots c_{j,k}$, map to and numerically represent the pixels $119_{1,1} \ldots 119_{j,k}$, respectively, after a second stage of interpolation. The third-interim-data set 154 may be represented as:

$$\text{third-interim-data set } 154 = \begin{Bmatrix} d_{1,1} & \cdots & d_{1,k} \\ \vdots & \ddots & \vdots \\ d_{j,1} & \cdots & d_{j,k} \end{Bmatrix} \quad (4)$$

where: the third-interim-data points $d_{1,1} \ldots d_{j,k}$, map to and numerically represent the pixels $119_{1,1} \ldots 119_{j,k}$, respectively, after a third stage of interpolation. The fourth-interim-data set 156 may be represented as:

$$\text{fourth-interim-data set } 156 = \begin{Bmatrix} e_{1,1} & \cdots & e_{1,k} \\ \vdots & \ddots & \vdots \\ e_{j,1} & \cdots & e_{j,k} \end{Bmatrix} \quad (5)$$

where: the fourth-interim-data points $e_{1,1} \ldots e_{j,k}$, map to and numerically represent the pixels $119_{1,1} \ldots 119_{j,k}$, respectively, after a fourth stage of interpolation. The interpolated-data set 158 may be represented as:

$$\text{interpolated-data set } 158 = \begin{Bmatrix} f_{1,1} & \cdots & f_{1,k} \\ \vdots & \ddots & \vdots \\ f_{j,1} & \cdots & f_{j,k} \end{Bmatrix} \quad (6)$$

where: the interpolated-data points $e_{1,1} \ldots e_{j,k}$, map to and numerically represent the pixels $119_{1,1} \ldots 119_{j,k}$, respectively, after the CFA-image-processing software 140 completes the interpolation of the pixels $119_{1,1} \ldots 119_{j,k}$.

Figure 6:
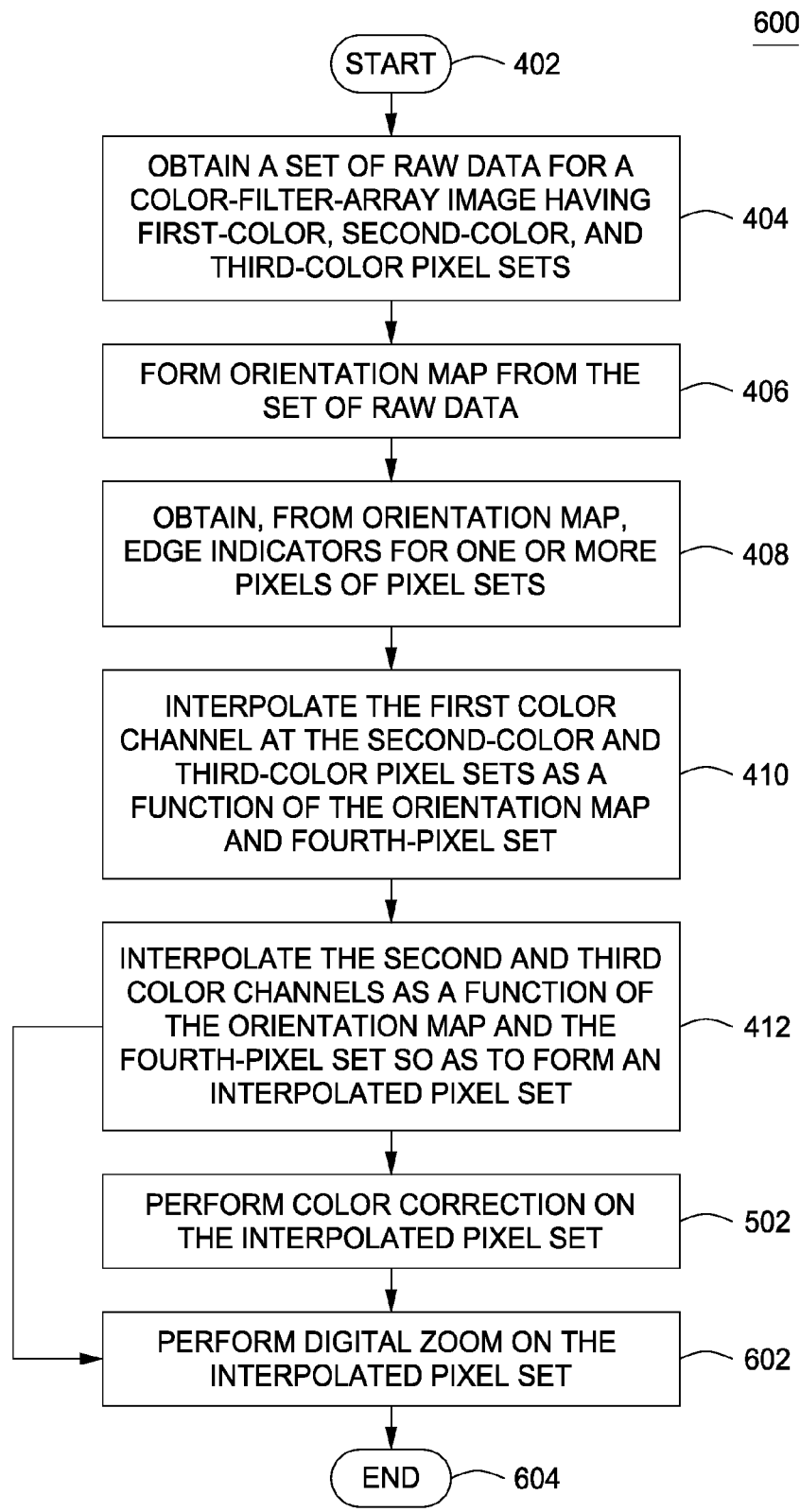
FIG. 6 is a flow diagram illustrating an example flow for performing a digital zoom of a demosaiced image formed from a CFA image.

As described in more detail with respect to FIG. 6, the CFA-image-processing software 140 may use the zoom-data set 160 to facilitate performing a digital zoom of the interpolated-data set 158. The zoom-data set 160 may be represented as:

$$\text{zoom-data set } 160 = \begin{Bmatrix} z_{1,1} & \cdots & z_{1,q} \\ \vdots & \ddots & \vdots \\ z_{p,1} & \cdots & z_{p,q} \end{Bmatrix} \quad (7)$$

where: zoom-data points $z_{1,1} \ldots z_{p,q}$, map to and numerically represent an expanded set of the pixels $119_{1,1} \ldots 119_{p,q}$, respectively, after the CFA-image-processing software 140 completes a digital zoom of the pixels $119_{1,1} \ldots 119_{j,k}$.

As described in more detail with respect to FIGS. 3-6, the CFA-image-processing software 140 may use the orientation map 148 to facilitate performing one or more of the various stages of the interpolation along with color correction and digital zooming. The orientation map 148 includes a number of edge indicators $g_{1,1} \ldots g_{j,k}$; one for each of the pixels $119_{1,1} \ldots 119_{j,k}$. These edge indicators $g_{1,1} \ldots g_{j,k}$ may be arranged in any number of ways. For simplicity of exposition, the orientation map 148 may be represented as:

$$\text{orientation map } 148 = \begin{Bmatrix} g_{1,1} & \cdots & g_{1,k} \\ \vdots & \ddots & \vdots \\ g_{j,1} & \cdots & g_{j,k} \end{Bmatrix} \quad (8)$$

where: the edge indicators $g_{1,1} \ldots g_{j,k}$, map to the pixels $119_{1,1} \ldots 119_{j,k}$, respectively.

The operating system 140 may include code for operating the processing platform 104 and for providing a platform onto which the CFA-image-processing software 140 may be executed. The CFA-image-processing software 140 may be executed by the processor 126 to control the operation of and/or facilitate performing functions for forming the demosaiced image. To do this, the CFA-image-processing software 140 may include one or more programmable and/or hard-coded functions, instructions, commands, directions, code and/or control data (collectively, "directives"). These directives, when executed by the processor 126, may interface with the memory 128 to obtain the data sets from the data store 144 for forming the demosaiced image.

As an alternative to the foregoing architecture, any of the directives of (i) the CFA-image-processing software 140, and (ii) the CFA-image-processing software 140 and/or other appropriate portion of the processing platform 104 may be implemented in any of software, firmware and/or hardware, and executed or otherwise addressed and instructed by the processor 126 to carry out such processing. To facilitate this, the directives and/or the CFA-image-processing software 140 together with the processor 126 (and or other portions of the processing platform 104) may be, for example, implemented a special-purpose computer, a field programmable gate array ("FPGA"), an application specific integrated circuit ("ASIC"), a general purpose processor ("GPP"), a system on a chip ("SoC"), and the like.

Figure 2:
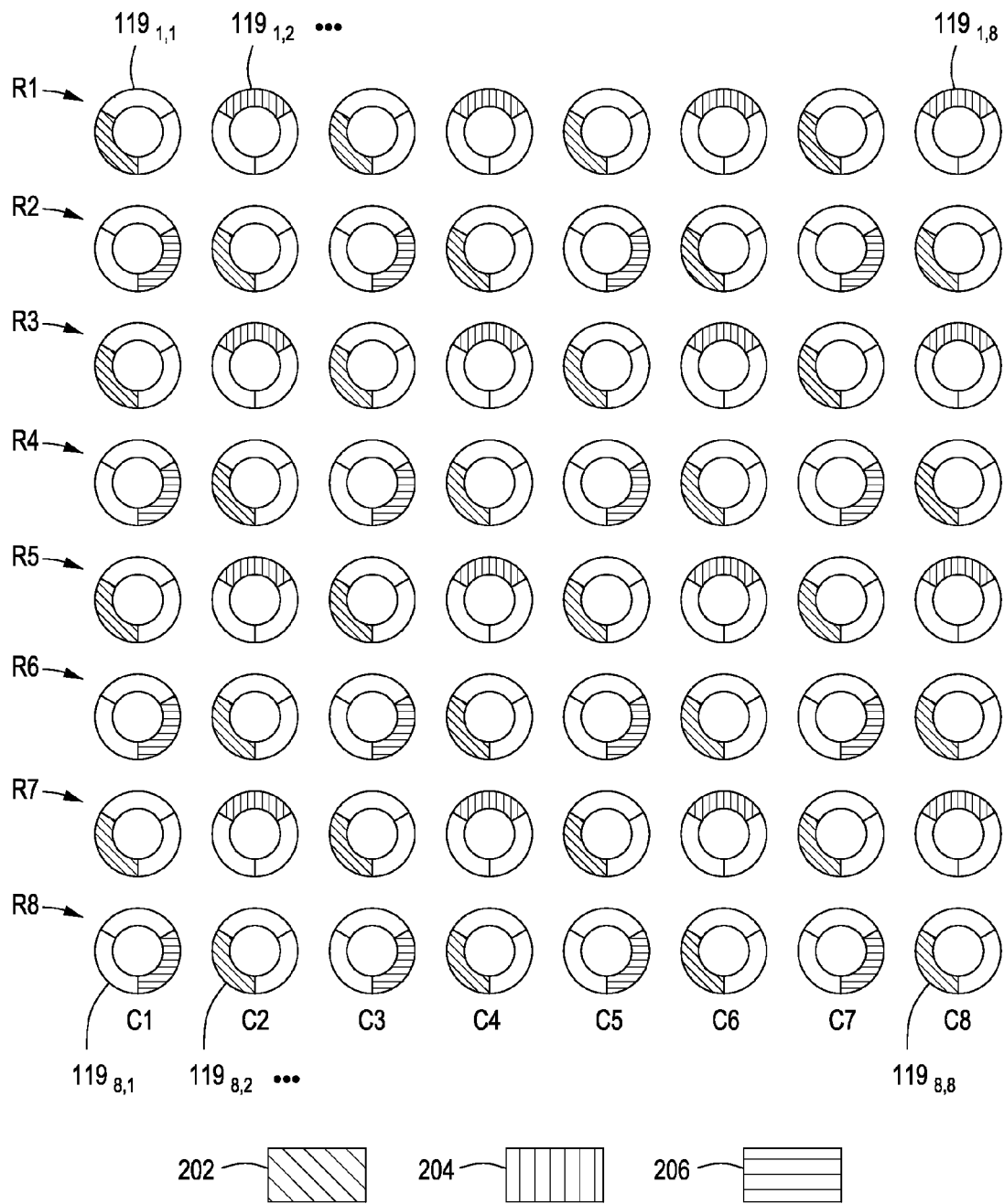
FIG. 2 is a block diagram illustrating an example pictorial rendering of a CFA image.

FIG. 2 is a block diagram illustrating an example pictorial rendering of a CFA image 200. The CFA image 200 includes the pixels $119_{1,1} \ldots 119_{8,8}$, which may be subdivided by color into three sets of pixels, namely, first-CFA-color-pixel, second-CFA-color-pixel and third-CFA-color-pixel sets 202, 204 and 206. The first-CFA-color-pixel set 202, which includes the pixels $119_{j,k}$, where j and k are both even or odd, may be colored according to a first (e.g., green) color channel of the CFA image 200. The second-CFA-color-pixel set 204, which includes the pixels $119_{j,k}$, where j is odd and k is even, may be colored according to a second (e.g., red) color channel of the CFA image 200. The third-CFA-color-pixel set 206, which includes the pixels $119_{j,k}$, where j is even k is odd, may be colored according to a third (e.g., blue) color channel of the CFA image 200.

In congruence with the CFA image 200, RAW-data points $a_{1,1} \ldots a_{8,8}$ may map to and numerically represent the pixels $119_{1,1} \ldots 119_{8,8}$, respectively. Like the CFA image 200, the RAW-data points $a_{1,1} \ldots a_{8,8}$ may be subdivided into the three sets, namely, first-CFA-color-data, second-CFA-color-data and third-CFA-color-data sets $A_1$, $A_2$ and $A_3$. The first-CFA-color-data set $A_1$ includes the RAW-data points $a_{j,k}$, where j and k are both even or odd. The second-CFA-color-data set $A_2$ includes the RAW-data points $a_{j,k}$, where j is odd and k is even. The third-CFA-color-data set $A_3$ includes the RAW-data points $a_{j,k}$, where j is even k is odd.

Although the CFA image 200, as shown, and RAW-data set 146 includes sixty-four pixels and sixty-four RAW-data points, respectfully, the CFA image 200 and the RAW-data set 146 may include more or fewer pixels and RAW-data points, respectfully. The CFA image 200 and RAW-data set 146 may include, for example, from about a few hundred to more than twenty million pixels and RAW-data points, respectfully.

Example Operation

Figure 3:
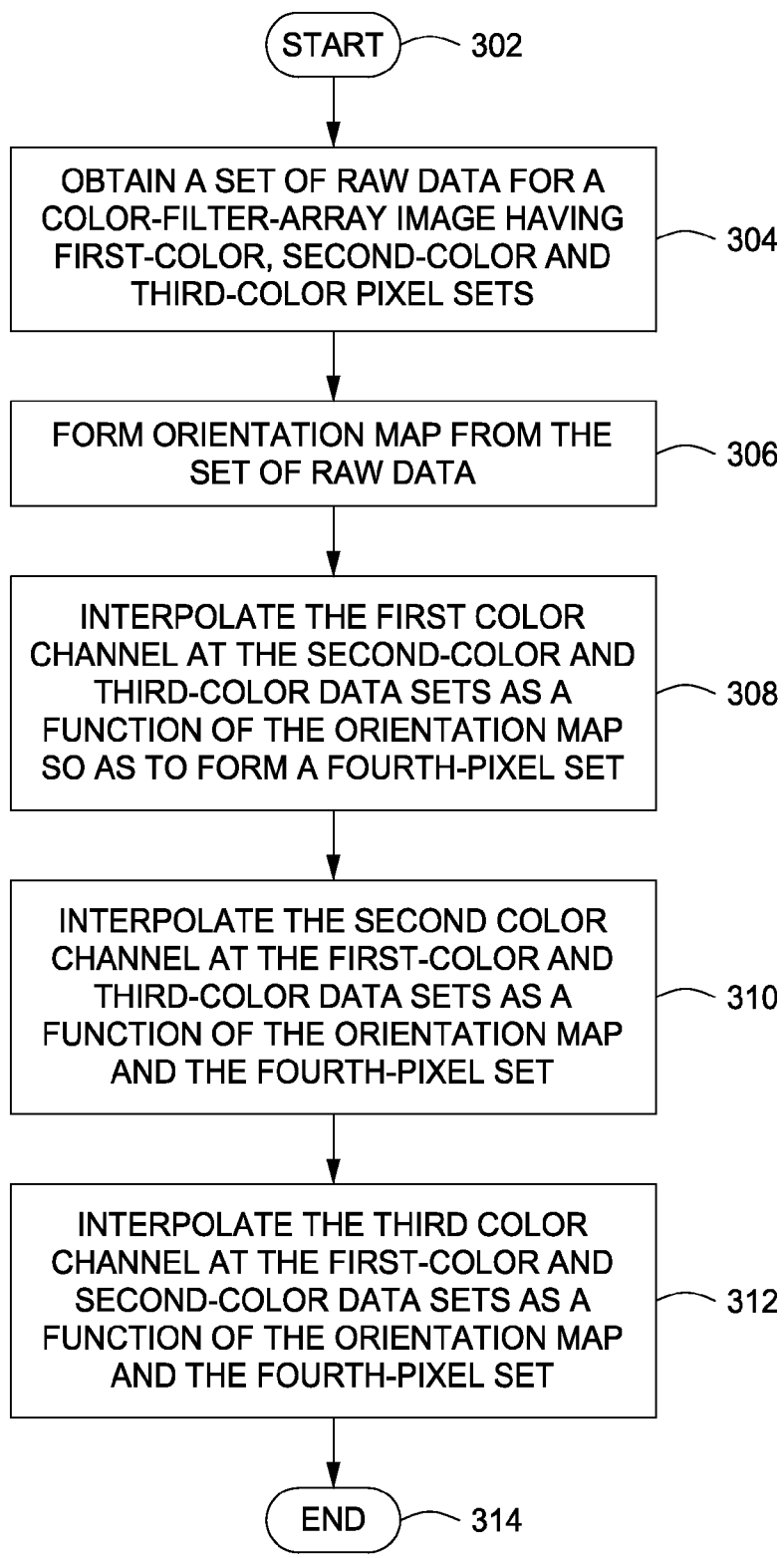
FIG. 3 is a flow diagram illustrating an example flow for forming a demosaiced image from a CFA image.

FIG. 3 is a flow diagram illustrating an example flow 300 for forming a demosaiced image from a CFA image. For convenience, the following describes the flow 300 with reference to the system 100 of FIG. 1 and the CFA image 200 of FIG. 2. The flow 300 may be carried out by other architectures as well.

The flow 300 starts at termination block 302, and sometime thereafter, transitions to process block 304. At process block 304, the processing platform 104 obtains from the imaging device 102 the RAW-data set 146. After process block 304, the flow 300 may transition to process block 306.

At process block 306, the processing platform 104, via the CFA-image-processing software 140, forms the orientation map 148. The CFA-image-processing software 140 may use the RAW-data set 146 to form orientation map 148 so as to include the edge indicators $g_{1,1} \ldots g_{8,8}$, which map to the pixels $119_{1,1} \ldots 119_{8,8}$. Each of the edge indicators $g_{1,1} \ldots g_{8,8}$ may be indicative of an orientation of an edge bounding its corresponding pixel, when such edge is well defined and/or dominates other edges bounding such pixel (collectively "well-defined edge"). Alternately, each of the edge indicators $g_{1,1} \ldots g_{8,8}$ may be indicative of may be indicative of a given construct when its corresponding pixel is not bounded by the well-defined edge.

By way of example, each edge indicator, $g_{r,c}$ (where r=row and c=column), of the edge indicators $g_{1,1} \ldots g_{8,8}$ may be indicative of any one of (i) a horizontal orientation, $h_0$, (ii) a vertical orientation, $h_{90}$, (iii) a forty-five-degree ("45-deg") orientation, $h_{45}$, (iv) a one-hundred-thirty-five-degree ("135-deg") orientation, $h_{135}$, and (v) a flat orientation, $h_f$. The edge indicator $g_{r,c}$ may be indicative of the horizontal orientation, $h_0$, when the well-defined edge bounding its corresponding pixel $119_{r,c}$ is oriented parallel or substantially parallel to the row in which such pixel $119_{r,c}$ is disposed. Alternatively, the edge indicator $g_{r,c}$ may be indicative of the vertical orientation, $h_{90}$, when the well-defined edge bounding its corresponding pixel $119_{r,c}$ is oriented perpendicular or substantially perpendicular to the row in which such pixel $119_{r,c}$ is disposed.

Figure 4:
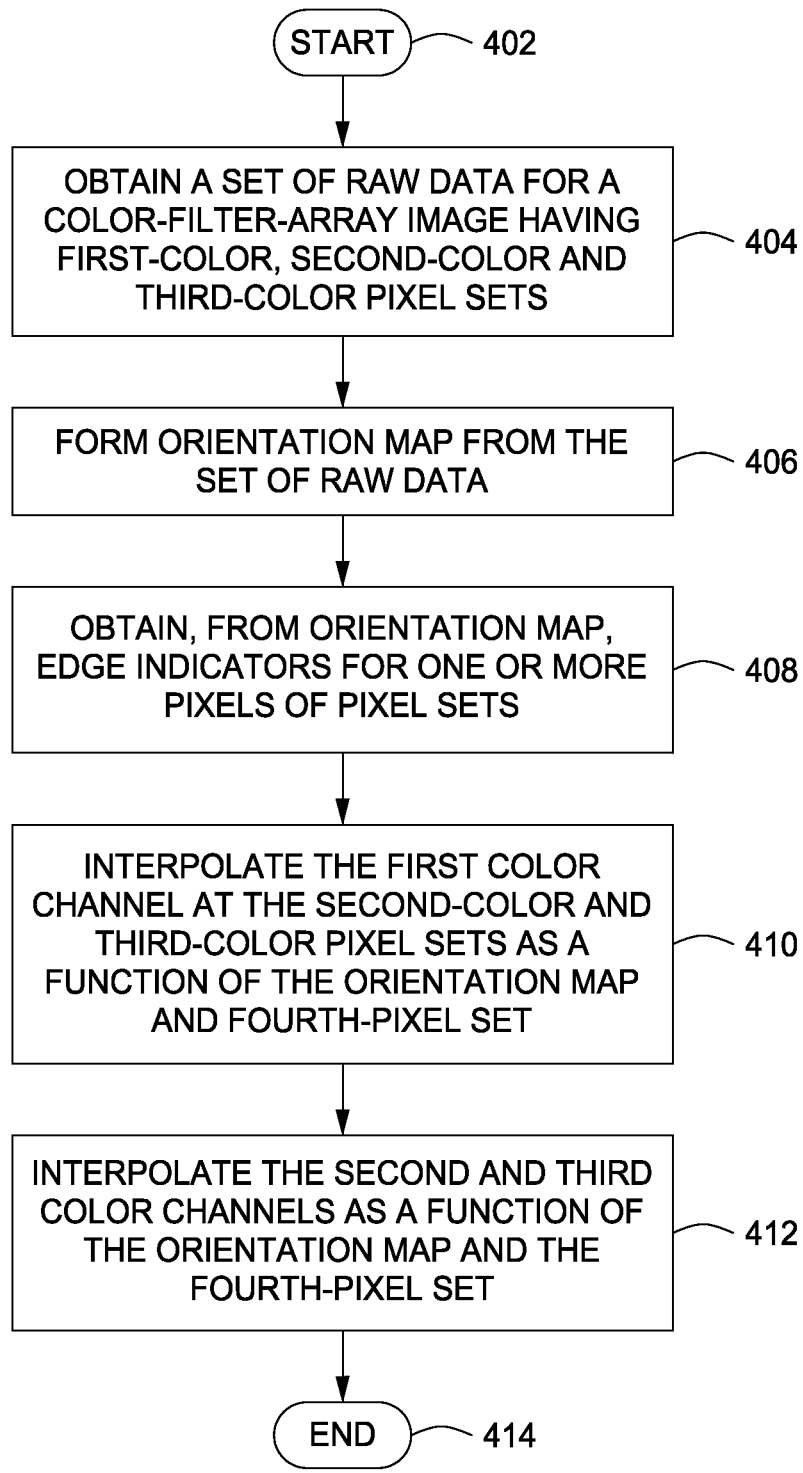
FIG. 4 is a flow diagram illustrating an example flow for forming a demosaiced image from a CFA image.

Analogously, the edge indicator $g_{r,c}$ may be indicative of the 45-deg orientation, $h_{45}$, when the well-defined edge bounding its corresponding pixel $119_{r,c}$ is oriented at forty-five degrees or at substantially forty-five degrees from the row in which such $119_{r,c}$ is disposed. As another alternative, the edge indicator $g_{r,c}$ may be indicative of the 135-deg orientation, $h_{135}$, when the well-defined edge bounding its corresponding pixel $119_{r,c}$ is oriented at one-hundred-thirty-five degrees or at substantially one-hundred-thirty-five degrees from the row in which such $119_{r,c}$ is disposed. The edge indicator $g_{r,c}$ (may be indicative of the flat orientation, $h_f$, when its corresponding pixel $119_{r,c}$ is not bounded by the well-defined edge (e.g., the edge indicator $g_{r,c}$ is not indicative of any of the horizontal, vertical, 45-deg and 135-deg orientations, $h_0$, $h_{90}$, $h_{45}$, and $h_{135}$). Described below, with respect to FIG. 4, are detailed examples for forming the edge indicators $g_{1,1} \ldots g_{8,8}$ from the RAW-data set 146.

After forming the orientation map, the flow 300 may transition to process block 308. At the process block 308, the processing platform 104, via the CFA-image-processing software 140, may interpolate the first color channel at the second-CFA-color-pixel and third-CFA-color-pixel sets 204, 206 as a function of the orientation map 148 so as to form a fourth set of pixels ("fourth-pixel set") as represented by the first-interim-data set 150. The CFA-image-processing software 140 typically interpolates the first color channel for each pixel of any of the second-CFA-color-pixel and third-CFA-color-pixel sets 204, 206. The CFA-image-processing software 140 may, however, interpolate the first color channel for less than all pixels of any of the second-CFA-color-pixel and third-CFA-color-pixel sets 204, 206. For any given pixel $119_{r,c}$ of the second-CFA-color-pixel and third-CFA-color-pixel sets 204, 206, the CFA-image-processing software 140 may interpolate it as follows.

The CFA-image-processing software 140 may initially populate the first-interim-data set 150 with the RAW-data set 146. This way, the first-interim-data points $b_{1,1} \ldots b_{8,8}$ initially map to the first-CFA-color-data, second-CFA-color-data and third-CFA-color-data sets $A_1$, $A_2$ and $A_3$.

In addition to populating the first-interim-data set 150, the CFA-image-processing software 140 may obtain, from the orientation map 148, the edge indicator $g_{r,c}$ for the given pixel $119_{r,c}$. The CFA-image-processing software 140 may then select, as a function of the edge indicator $g_{r,c}$, a first filter for estimating the first color channel at the given pixel $119_{r,c}$. To facilitate such estimation, the first filter may be adapted to estimate the first color channel at the given pixel $119_{r,c}$ as a function of a first gradient. This first gradient may be formed from one or more pixels of the first-CFA-color-pixel set 202 disposed in the edge bounding the given pixel $119_{r,c}$ ("edge boundary"), as indicated by the edge indicator $g_{r,c}$. The first filter, and in turn, the first gradient may be formed, for example, from a linear or non-linear analysis of one or more of the RAW-data points $a_{1,1} \ldots a_{8,8}$ of the first-CFA-color-data set, $A_1$, that correspond to the edge boundary ("edge-boundary-data set, $A_{1\_edge}$").

After selecting the first filter, the CFA-image-processing software 140 may apply it, at the at pixel $119_{r,c}$, to estimate the first color channel at the given pixel $119_{r,c}$. To do this, the CFA-image-processing software 140 may compute the first gradient using the edge-boundary-data set, $A_{1\_edge}$ to form an estimation of the first color channel ("first-color-channel estimation"). The CFA-image-processing software 140 may also amalgamate, coalesce, integrate or otherwise combine (collectively "combine") the first-color-channel estimation with the RAW-data point $a_{r,c}$, and store it as first-interim-data point $b_{r,c}$.

By performing the forgoing for each pixel of the second-CFA-color-pixel and third-CFA-color-pixel sets 204, 206, as appropriate, the CFA-image-processing software 140 may populate the first-interim-data set 150 so that it defines a color plane for the first color channel ("first-color plane"). That is, each of the first-interim-data points $b_{1,1} \ldots b_{8,8}$ may include a contribution from the first color channel. As such, the first-interim-data points $b_{1,1} \ldots b_{8,8}$ include (i) data for a first subset of pixels ("first/second-color-data set"), $B_1$, (ii) data for a second subset of pixels ("first/third-color-data set"), $B_2$, and (iii) the first-CFA-color-data set, $A_1$.

The first/second-color-data set, $B_1$, (e.g., first-interim-data point $b_{j,k}$, where j is odd and k is even), when rendered, causes the first subset of pixels ("first/second-color-pixel set") to be colored according to the second color channel and an estimate of the first color channel. The first/third-color-data set, $B_2$, (e.g., first-interim-data points $b_{j,k}$, where j is even and k is odd), when rendered, causes the second subset of pixels ("first/third-color-pixel set") to be colored according to the third color channel and an estimate of the first color channel.

After process block 308, the flow 300 may transition to process block 310. At the process block 310, the processing platform 104, via the CFA-image-processing software 140, may interpolate the second color channel at the first-CFA-color-pixel set 202 and first/third-color-pixel set as a function of the orientation map 148 and fourth-pixel set as represented by the first-interim-data set 150.

The CFA-image-processing software 140 typically interpolates the second color channel for each pixel of any of the first-CFA-color-pixel set 202 and first/third-color-pixel set. The CFA-image-processing software 140 may, however, interpolate the first color channel for less than all pixels of any of first-CFA-color-pixel set 202 and first/third-color-pixel set.

In addition, the CFA-image-processing software 140 may interpolate the second color channel for the first-CFA-color-pixel set 202 and the first/third-color-pixel set in one or more stages. For example, the CFA-image-processing software 140 may interpolate the second color channel for the first-CFA-color-pixel set 202 in a first stage, and for the first/third-color-pixel set in a second channel. At the first stage, the CFA-image-processing software 140 may interpolate any given pixel $119_{r,c}$ of the first-CFA-color-pixel set 202 as follows.

The CFA-image-processing software 140 may initially populate the second-interim-data set 152 with the first-interim-data set 150. This way, the second-interim-data points $c_{1,1} \ldots c_{8,8}$ initially map to the first-CFA-color-data, first/second-color-data, and first/third-color-data sets $A_1$, $B_1$ and $B_2$.

The CFA-image-processing software 140 may obtain, from the orientation map 148, the edge indicator $g_{r,c}$ for the given pixel $119_{r,c}$. The CFA-image-processing software 140 may then select, as a function of the edge indicator $g_{r,c}$, a second filter for estimating the second color channel at the given pixel $119_{r,c}$. To facilitate such estimation, the second filter may be adapted to estimate the second color channel at the given pixel $119_{r,c}$ as a function of a second gradient. This second gradient may be formed from one or more pixels of the first/second-color-data set, $B_1$, disposed in the edge boundary indicated by the edge indicator $g_{r,c}$. The second filter, and in turn, the second gradient may be formed, for example, from a linear or non-linear analysis of one or more of the first-interim-data points $b_{1,1} \ldots b_{8,8}$ of the first/second-color-data set, $B_1$, that correspond to the edge boundary ("edge-boundary-data set, $B_{1\_edge1}$").

After selecting the second filter, the CFA-image-processing software 140 may apply it, at the at pixel $119_{r,c}$, to estimate the second color channel at the given pixel $119_{r,c}$. To do this, the CFA-image-processing software 140 may compute the second gradient using the edge-bounding-data set, $B_{1\_edge1}$ to form an estimation of the second color channel ("second-color-channel estimation"). The CFA-image-processing software 140 may also combine the second-colorchannel estimation with the first-interim-data point $b_{r,c}$, and store it as second-interim-data point $c_{r,c}$.

By performing the forgoing for each pixel of the first/second-color-data set, $B_1$, as appropriate, each of the second-interim-data points $c_{1,1} \ldots c_{8,8}$ corresponding to the first-CFA-color-pixel set 202 may include a contribution from the second color channel. As such, the second-interim-data points $c_{1,1} \ldots c_{8,8}$ include (i) data for an expanded first/second-color-data set, $C_1$, and (ii) the first/third-color-data set $B_2$.

The expanded first/second-color-data set, $C_1$, includes the first/second-color-data set, $B_1$, and the second-interim-data points $c_{1,1} \ldots c_{8,8}$ corresponding to the first-CFA-color-pixel set 202 interpolated in the first stage. Like the first/second-color-data set, $B_1$, the first/second-color-data set, $C_1$, when rendered, causes the first/second-color-pixel set to be colored according to (i) the second color channel and an estimate of the first color channel, and/or (ii) the first color channel and an estimate of the second color channel.

After the first stage, the CFA-image-processing software 140 may perform a second stage of the interpolation to form the third-interim-data set 154. To facilitate forming the third-interim-data set 154, the CFA-image-processing software 140 may initially populate the third-interim-data set 154 with the second-interim-data set 152. This way, the third-interim-data points $d_{1,1} \ldots d_{8,8}$ initially map to the first/second-color-data set, $C_1$, and the first/third-color-data set, $B_2$.

After populating the third-interim-data set 154, the CFA-image-processing software 140 may obtain, from the orientation map 148, the edge indicator $g_{r,c}$ for the given pixel $119_{r,c}$ of the first/third-color-pixel set. The CFA-image-processing software 140 may then select, as a function of the edge indicator $g_{r,c}$, a third filter for estimating the second color channel at the given pixel $119_{r,c}$. To facilitate such estimation, the third filter may be adapted to estimate the second color channel at the given pixel $119_{r,c}$ as a function of a third gradient. This third gradient may be formed from one or more pixels of the first/second-color-data set, $C_1$, disposed in the edge boundary indicated by the edge indicator $g_{r,c}$. The third filter, and in turn, the third gradient may be formed, for example, from a linear or non-linear analysis of one or more of the second-interim-data points $c_{1,1} \ldots c_{8,8}$ of the first/second-color-data set, $B_1$, that correspond to the edge boundary ("edge-boundary-data set, $B_{1\_edge2}$").

After selecting the third filter, the CFA-image-processing software 140 may apply it, at the at pixel $119_{r,c}$, to estimate the second color channel at the given pixel $119_{r,c}$. To do this, the CFA-image-processing software 140 may compute the third gradient using the edge-boundary-data set, $B_{1\_edge2}$ to form another second-color-channel estimation. The CFA-image-processing software 140 may also combine such second-color-channel estimation with the third-interim-data point $c_{r,c}$, and store it as third-interim-data point $d_{r,c}$.

By performing the forgoing for each pixel of the first/third-color-data set, $B_2$, as appropriate, each of the third-interim-data points $d_{1,1} \ldots d_{8,8}$ corresponding to the first/third-color-pixel set may include a contribution from the second color channel. As such, the third-interim-data points $d_{1,1} \ldots d_{8,8}$ include (i) the expanded first/second-color-data set, $C_1$, and (ii) data for a third subset of pixels ("first/second/third-color-data set"), $D_1$. The first/second/third-color-data set, $D_1$, when rendered, causes the third subset of pixels ("first/second/third-color-pixel set") to be colored according to the third color channel and estimates of the first and second color channels.

After process block 310, the flow 300 may transition to process block 312. At the process block 312, the processing platform 104, via the CFA-image-processing software 140, may interpolate the third color channel at the expanded first/second-color-data set, $C_1$, as a function of the orientation map 148 and the fourth-pixel set as represented by the third-interim-data set 154.

The CFA-image-processing software 140 typically interpolates the third color channel for each pixel of the expanded first/second-color-data set, $C_1$. The CFA-image-processing software 140 may, however, interpolate the third color channel for less than all pixels of expanded first/second-color-data set, $C_1$. For any given pixel of the expanded first/second-color-data set, $C_1$, the CFA-image-processing software 140 may interpolate it as follows.

The CFA-image-processing software 140 may initially populate the interpolated-data set 158 with the third-interim-data set 154. This way, the interpolated-data points $f_{1,1} \ldots f_{8,8}$ initially map to the expanded first/second-color-data set, $C_1$, and the first/second/third-color-data set, $D_1$.

The CFA-image-processing software 140 may obtain, from the orientation map 148, the edge indicator $g_{r,c}$ for the given pixel $119_{r,c}$. The CFA-image-processing software 140 may then select, as a function of the edge indicator $g_{r,c}$, a fourth filter for estimating the third color channel at the given pixel $119_{r,c}$. To facilitate such estimation, the fourth filter may be adapted to estimate the third color channel at the given pixel $119_{r,c}$ as a function of a fourth gradient. This fourth gradient may be formed from one or more pixels of the first/second/third-color-data set, $D_1$, disposed in the edge boundary indicated by the edge indicator $g_{r,c}$. The fourth filter, and in turn, the fourth gradient may be formed, for example, from a linear or non-linear analysis of one or more of the third-interim-data points $d_{1,1} \ldots d_{8,8}$ of the first/second/third-color-data set, $D_1$, that correspond to the edge boundary ("edge-boundary-data set, $D_{1\_edge}$").

After selecting the fourth filter, the CFA-image-processing software 140 may apply it, at the at pixel $119_{r,c}$, to estimate the third color channel at the given pixel $119_{r,c}$. To do this, the CFA-image-processing software 140 may compute the fourth gradient using the edge-boundary-data set, $D_{1\_edge}$ to form an estimation of the third color channel ("third-color-channel estimation"). The CFA-image-processing software 140 may also combine the third-color-channel estimation with the third-interim-data point $d_{r,c}$, and store it as interpolated-data point $f_{r,c}$.

By performing the forgoing for each pixel of the expanded first/second-color-data set, $C_1$, as appropriate, the interpolated-data set 158 defines the first-color plane and second and third color planes. That is, each of the interpolated-data points $f_{1,1} \ldots f_{8,8}$ may include a contribution from the first, second and third color channels. As such, the interpolated-data points $f_{1,1} \ldots f_{8,8}$ include an expanded first/second/third-color-data set, $F_1$. The first/second/third-color-data set, $F_1$, when rendered, causes the first/second/third-color-pixel set to be colored according to (i) the first color channel and estimates of the second and third color channels, (ii) the second color channel and estimates of the first and third color channels, and/or (ii) the third color channel and estimates of the first and second color channels.

After process block 312, the flow 300 may transition to termination block 314. At termination block 314, the flow 300 may end. Alternatively, the flow 300 may be repeated periodically, in continuous fashion, or upon being triggered as a result of a condition, such as an impetus for forming one or more demosaiced images.

Alternative Example Operations

FIG. 4 is a flow diagram illustrating an example flow 400 for forming a demosaiced image from a CFA image. For convenience, the following describes the flow 400 with reference to the system 100 of FIG. 1 and the CFA image 200 of FIG. 2. The flow 400 may be carried out by other architectures as well.

The flow 400 starts at termination block 402, and sometime thereafter, transitions to process block 404. At process block 404, the processing platform 104 obtains from the imaging device 102 the RAW-data set 146. After process block 404, the flow 400 may transition to process block 406.

At process block 406, the processing platform 104, via the CFA-image-processing software 140, forms the orientation map 148. The CFA-image-processing software 140 may form the orientation map 148 as described above with respect to process block 306 of FIG. 3. In addition, the CFA-image-processing software 140 may resolve each edge indicator $g_{r,c}$, of the edge indicators $g_{1,1} \ldots g_{8,8}$ to facilitate forming the orientation map. To resolve such edge indicator $g_{r,c}$, the CFA-image-processing software 140 may examine some or all of the pixels $119_{1,1} \ldots 119_{8,8}$ neighboring the pixel $119_{r,c}$ ("neighboring pixels $119_{r-n,c-n} \ldots 119_{r+n,c+n}$") to determine whether the edge indicator $g_{r,c}$ is indicative of (i) the given construct or (ii) the orientation of the well-defined edge. To do this, the CFA-image-processing software 140 may form from the neighboring pixels $119_{r-n,c-n} \ldots 119_{r+n,c+n}$ respective gradients at any of, and typically all of, the horizontal, vertical, 45-deg, and 135-deg orientations, $h_0$, $h_{90}$, $h_{45}$, and $h_{135}$. The CFA-image-processing software 140 may form such gradients as described below or, alternatively, using edge detection filtering.

The CFA-image-processing software 140 may use a standard edge detection filter or gradient based method for detecting horizontal edges. For example, the CFA-image-processing software 140 may form a horizontal gradient, $i_0$, at the horizontal orientation, $h_0$, for the pixel $119_{r,c}$ as follows:

$$i_0(119_{r,c}) = \frac{|a_{r-1,c+1} - a_{r-1,c-1}| + |a_{r+1,c+1} - a_{r+1,c-1}|}{d} + |a_{r,c+1} - a_{r,c-1}| \tag{9}$$

where: 1<r<63 and is 1<c<63 for the RAW-data set 146, and d is the dependent upon the distance of the pixel in question. For r=1 and/or c=1 and for r=64 and/or c=64, padding is used to satisfy equation (9). Such padding may be formed using replication and/or mirroring.

The CFA-image-processing software 140 may form a vertical gradient, $i_{90}$, at the vertical orientation, $h_{90}$, for the pixel $119_{r,c}$ as follows:

$$i_{90}(119_{r,c}) = \frac{|a_{r-1,c-1} - a_{r+1,c-1}| + |a_{r-1,c+1} - a_{r+1,c+1}|}{d} + |a_{r-1,c} - a_{r+1,c}| \tag{10}$$

where: 1<r<63 and is 1< c<63 for the RAW-data set 146, and d is the dependent upon the distance of the pixel in question. For r=1 and/or c=1 and for r=64 and/or c=64; padding is used to satisfy equation (10). The padding may be formed using replication and/or mirroring.

The same horizontal edge detector should be applied for all the pixels. Special padding will be done for the pixels near the corners of the image for creating the data required for edge detection The CFA-image-processing software 140 may form a 45-deg gradient, $i_{45}$, at the 45-deg orientation, $h_{45}$, for the pixel $119_{r,c}$ as follows:

$$i_{45}(119_{r,c}) = \frac{|a_{r-1,c} - a_{r+1,c-2}| + |a_{r-1,c+2} - a_{r+1,c}|}{2d} + \frac{|a_{R-1,C+1} - a_{R+1,C-1}|}{d} \tag{11}$$

where: 1< r<63 and is 2< c<62 for the RAW-data set 146, and d is the dependent upon the distance of the pixel in question. For r=1 and/or c<2 and for r=64 and/or c>62, padding is used to satisfy equation (11). The padding may be formed using replication and/or mirroring.

The CFA-image-processing software 140 may form a 135-deg gradient, $i_{135}$, at the 135-deg orientation, $h_{135}$, for the pixel $119_{r,c}$ as follows:

$$i_{135}(119_{r,c}) = \frac{|a_{r-1,c-2} - a_{r+1,c}| + |a_{r-1,c} - a_{r+1,c+2}|}{2d} + \frac{|a_{r-1,c-1} - a_{r+1,c+1}|}{d} \tag{12}$$

where: 1< r<63 and is 2< c<62 for the RAW-data set 146, and d is the dependent upon the distance of the pixel in question. For r=1 and/or c<2 and for r=64 and/or c>62, padding is used to satisfy equation (12). Such padding may be formed using replication and/or mirroring.

After forming the horizontal, vertical, 45-deg and 135-deg gradients, $i_0$, $i_{90}$, $i_{45}$, and $i_{135}$, the CFA-image-processing software 140 may determine which, if any, of these gradients $i_0$, $i_{90}$, $i_{45}$, and $i_{135}$, indicate that the pixel $119_{r,c}$ is bounded by the well-defined edge. The CFA-image-processing software 140 may, for example, make such determination as follows:

$$[I_1,I_2,I_3,I_4]=\text{SortAsc}[i_0,i_{45},i_{90},i_{135}] \tag{13}$$

if $[I_2-I_1 \geq \tau_1]$, then bounded by the well-defined edge corresponding to gradient $I_1$ (14)

where: $\tau_1$ is a given threshold. This given threshold may be formed as a function of bit depths of the pixel $119_{r,c}$.

The CFA-image-processing software 140 may also determine that the pixel $119_{r,c}$ is not bounded by the well-defined edge. The CFA-image-processing software 140 may, for example, make this determination as follows:

if $[I_2-I_1\tau_1]$, then not bounded by the well-defined edge (15)

After determining whether the pixel $119_{r,c}$ is or is not bounded by the well-defined edge, the CFA-image-processing software 140 may resolve the edge indicator $g_{r,c}$ to (i) the flat orientation, $h_f$, when the pixel $119_{r,c}$ is not bounded by the well-defined edge or (ii) the orientation corresponding to the gradient $I_1$ (i.e., the orientation corresponding to the horizontal, vertical, 45-deg and 135-deg gradient, $i_0$, $i_{90}$, $i_{45}$, and $i_{135}$ having the well-defined edge).

After forming the orientation map, the flow 400 may transition to process block 408. At the process block 408, the processing platform 104, via the CFA-image-processing software 140, obtains from the orientation map 148 the edge indicators $g_{1,1} \ldots g_{8,8}$ for the pixels $119_{1,1} \ldots 119_{8,8}$. After process block 408, the flow 400 may transition to process block 410.

At the process block 410, the processing platform 104, via the CFA-image-processing software 140, may interpolate the first color channel at the second-CFA-color-pixel and third-CFA-color-pixel sets 204, 206 as a function of the orientation map 148 so as to form the fourth-pixel set as represented by the first-interim-data set 150. To facilitate forming the first-interim-data set 150, the CFA-image-processing software 140 may initially populate the first-interim-data set 150 with the RAW-data set 146. As above, the first-interim-data points $b_{1,1} \ldots b_{8,8}$ initially map to the first-CFA-color-data, second-CFA-color-data and third-CFA-color-data sets $A_1$, $A_2$ and $A_3$.

After populating the first-interim-data set 150, the CFA-image-processing software 140 may (i) interpolate the first color channel for any of the second-CFA-color-pixel and third-CFA-color-pixel sets 204, 206 using the second-CFA-color-data and third-CFA-color-data sets $A_2$ and $A_3$; and (ii) populate the first-interim-data set 150 corresponding to the second-CFA-color-data and third-CFA-color-data sets $A_2$ and $A_3$ with data representative of the first color channel for the second-CFA-color-pixel and third-CFA-color-pixel sets 204, 206 so interpolated.

The CFA-image-processing software 140 typically interpolates the first color channel for each pixel of any of the second-CFA-color-pixel and third-CFA-color-pixel sets 204, 206. The CFA-image-processing software 140 may, however, interpolate the first color channel for less than all pixels of any of the second-CFA-color-pixel and third-CFA-color-pixel sets 204, 206. For any given pixel $119_{r,c}$ of the second-CFA-color-pixel and third-CFA-color-pixel sets 204, 206, the CFA-image-processing software 140 may interpolate it as follows.

The CFA-image-processing software 140 may first obtain, from the edge indicators $g_{1,1} \ldots g_{8,8}$, the edge indicator $g_{r,c}$ corresponding to the pixel $119_{r,c}$. After obtaining the edge indicator $g_{r,c}$, the CFA-image-processing software 140 may then select, as a function of the edge indicator $g_{r,c}$, a filter ("FCC filter") for estimating the first color channel at the pixel $119_{r,c}$.

The FCC filter may be adapted to estimate the first color channel as a function of a first gradient formed from one or more of the first-CFA-color-pixel set 202 that are disposed in the edge boundary indicated by the edge indicator $g_{r,c}$. The FCC filter, and in turn, the first gradient may be formed as a function of (i) a single subset of the first-CFA-color-pixel set 202 that are disposed in the edge boundary ("single-subset candidate") or (ii) two subsets of the first-CFA-color-pixel set 202 that are disposed in the edge boundary ("double-subset candidate"). Table 1, below, includes a list of possible orientations of the edge indicator $g_{r,c}$; and for each of the possible orientations, (i) one or more of possible single-subset candidates, and/or (ii) a possible double-subset candidate for forming the FCC filter.

in Table 1, third row, second column, namely, a first vertical-dataset candidate, $can_{V1}$. When the edge indicator $g_{r,c}$ is indicative of the flat orientation, $h_f$, the FCC filter may be formed as a function of the double-subset candidate shown in Table 1, sixth row, third column, namely, a first flat-subset candidate, $can_{FLAT\_DBL1}$.

Alternatively, when the edge indicator $g_{r,c}$ is indicative of is indicative of the 45-deg orientation, $h_{45}$, the FCC filter may be formed as a function of (i) one of two of the possible single-subset candidates, namely, an upper single-subset candidate ("45-upper-dataset candidate, $can_{45U}$") or a lower single-subset candidate ("45-lower-dataset candidate, $can_{45L}$"), as shown in Table 1, fourth row, second column, or (ii) the double-subset candidate ("first 45-double-dataset candidate, $can_{45DLB1}$"), as shown in Table 1, fourth row, third column. Analogously, when the edge indicator $g_{r,c}$ is indicative of is indicative of the 135-deg orientation, $h_{135}$, the FCC filter may be formed as a function of (i) an upper single-subset candidate ("135-upper-dataset candidate, $can_{135U}$") or a lower single-subset candidate ("135-lower-dataset candidate, $can_{135L}$"), as shown in Table 1, fifth row, second column, or (ii) the double-subset candidate ("first 135-double-dataset candidate, $can_{135DBL1}$"), as shown in Table 1, fifth row, third column.

To determine which of the $can_{135U}$, $can_{135L}$ or $can_{135DBL1}$ (and/or the $can_{45U}$, $can_{45L}$ or $can_{45DBL1}$) to use for forming the FCC filter, the CFA-image-processing software 140 may determine, responsive to the edge indicator $g_{r,c}$ being indicative of the 135-deg orientation, $h_{135}$ (and/or being indicative of the 45-deg orientation, $h_{45}$) which of such candidates is closely related to the pixel $119_{r,c}$. By way of example, the CFA-image-processing software 140 may determine which of the $can_{135U}$, $can_{135L}$ or $can_{135DBL1}$ to select as follows.

The CFA-image-processing software 140 may first select from the RAW-data set 148 a population of the RAW-data points $a_{1,1} \ldots a_{8,8}$ for evaluating the $can_{135U}$ ("upper-candidate population" or "$UCP_{r,c}$"). In general, the upper-candidate population may include the $can_{135U}$ along with the RAW-data points $a_{1,1} \ldots a_{8,8}$ that represent the neighboring pixels $119_{1,1} \ldots 119_{8,8}$ that reside at the 135-deg orientation, $h_{135}$, (i) in line with the $can_{135U}$ and/or (ii) offset from such neighboring pixels $119_{1,1} \ldots 119_{8,8}$ by one or more columns in the

TABLE 1

| Edge Indicator | Single-Subset Candidates | Double-Subset Candidates |
|---|---|---|
| Horizontal orientation, $h_0$ | $\{a_{r,c-3}\ a_{r,c-1}\ a_{r,c+1}\ a_{r,c+3}\}$ | N/A |
| Vertical orientation, $h_{90}$ | $\{a_{r-3,c}\ a_{r-1,c}\ a_{r+1,c}\ a_{r+3,c}\}$ | N/A |
| 45-deg orientation, $h_{45}$ | Upper - $\{a_{r-2,c+1}\ a_{r-1,c}\ a_{r,c-1}\ a_{r+1,-c-2}\}$<br>Lower - $\{a_{r-1,c+2}\ a_{r,c+1}\ a_{r+1,c}\ a_{r+2,-c-1}\}$ | $\{a_{r-2,c+1}\ a_{r-1,c}\ a_{r,c-1}\ a_{r+1,-c-2}\}$<br>$\{a_{r-1,c+2}\ a_{r,c+1}\ a_{r+1,c}\ a_{r+2,-c-1}\}$ |
| 135-deg orientation, $h_{135}$ | Upper - $\{a_{r-2,c-1}\ a_{r-1,c}\ a_{r,c+1}\ a_{r+1,-c+2}\}$<br>Lower - $\{a_{r-1,c-2}\ a_{r,c-1}\ a_{r-1,c}\ a_{r+2,c+1}\}$ | $\{a_{r-2,c-1}\ a_{r-1,c}\ a_{r,c+1}\ a_{r+1,c+2}\}$<br>$\{a_{r-1,c-2}\ a_{r,c-1}\ a_{r-1,c}\ a_{r+2,c+1}\}$ |
| Flat orientation, $h_f$ | N/A | $\{a_{r,c-3}\ a_{r,c-1}\ a_{r,c+1}\ a_{r,c+3}\}$<br>$\{a_{r-3,c}\ a_{r-1,c}\ a_{r+1,c}\ a_{r+3,c}\}$ |

In accord with the Table 1, when the edge indicator $g_{r,c}$ is indicative of the horizontal orientation, $h_0$, the FCC filter may be formed as a function of the single-subset candidate shown in Table 1, second row, second column, namely, a first horizontal-dataset candidate, $can_{H1}$. When the edge indicator $g_{r,c}$ is indicative of the vertical orientation, $h_{90}$, the FCC filter may be formed as a function of the single-subset candidate shown positive direction. The upper-candidate population may include, for example:

$$UCP_{r,c} = \begin{pmatrix} a_{i,n} & \cdots & a_{i,m} \\ & \ddots & \vdots \\ & & a_{l,m} \end{pmatrix} \quad (16)$$

where: $1 \leq i < 8$; $i+1+|c-r| \leq n \leq 7$; $i+1 \leq I \leq 7+|c-r|$; and $i+1 \leq m \leq 8$.

After selecting the upper-candidate population, the CFA-image-processing software 140 may then calculate, as a function of the $can_{135U}$, an average of the first color channel for the upper-candidate population, $\overline{FCC}_{upper}$. To calculate the $\overline{FCC}_{upper}$, the CFA-image-processing software 140 may apply the $can_{135U}$ to a filter. Assuming that such filter is a four-tap filter as follows:

$$i = [i_1 \ i_2 \ i_3 \ i_4] \quad (17)$$

then the $\overline{FCC}_{upper}$ may be expressed as and solved using:

$$\overline{FCC}_{upper} = i_1 a_{r-2,c-1} + i_2 a_{r-1,c} + i_3 a_{r,c+1} + i_4 a_{r+1,c+2}) \quad (18)$$

After calculating the selecting the $\overline{FCC}_{upper}$, the CFA-image-processing software 140 may calculate a ratio of an average difference between (i) the first color channel of the upper-candidate population, $FCC_{UCP}$, and (ii) a color channel matching or otherwise corresponding to a color channel of the pixel 119$_{r,c}$ ("corresponding-color channel" or "$CCC_{UCP}$") of the upper-candidate population, $(\overline{FCC_{UCP} - CCC_{UCP}})_{upper}$. The $(\overline{FCC_{UCP} - CCC_{UCP}})_{upper}$ may be expressed as and solved using:

$$(\overline{FCC_{UCP} - CCC_{UCP}})_{upper} = 0.5(a_{r-1,c} - a_{r-2,c}) + 0.5(a_{r,c+1} - a_{r,c+2}) \quad (19)$$

After determining the $(\overline{FCC_{UCP} - CCC_{UCP}})_{upper}$, the CFA-image-processing software 140 may determine an estimate of corresponding-color channel of the upper-candidate population, $CCC_{upper}$, as follows:

$$CCC_{upper} = \overline{FCC}_{upper} - (\overline{FCC_{UCP} - CCC_{UCP}})_{upper} \quad (20)$$

The CFA-image-processing software 140 may also select from the RAW-data set 148 another population of the RAW-data points $a_{1,1} \ldots a_{8,8}$ for evaluating the $can_{135L}$ ("lower-candidate population" or "$LCP_{r,c}$"). In general, the lower-candidate population may include the $can_{135L}$ along with the RAW-data points $a_{1,1} \ldots a_{8,8}$ that represent the neighboring pixels 119$_{1,1} \ldots$ 119$_{8,8}$ that reside at the 135-deg orientation, $h_{135}$, (i) in line with the $can_{135U}$ and/or (ii) offset from such neighboring pixels 119$_{1,1} \ldots$ 119$_{8,8}$ by one or more columns in the negative direction. The lower-candidate population may include, for example:

$$LCP_{r,c} = \begin{pmatrix} a_{i,n} & & \\ \vdots & \ddots & \\ a_{l,n} & \ldots & a_{l,m} \end{pmatrix} \quad (21)$$

where: $1 \leq i < 8$; $i-1-|c-r| \leq n \leq 7$; $i+1 \leq I \leq 8$; and $n+1 \leq m \leq 8$.

After selecting the lower-candidate population, the CFA-image-processing software 140 may then calculate, as a function of the $can_{135L}$, an average of the first color channel for the lower-candidate population, $\overline{FCC}_{lower}$. To calculate the $\overline{FCC}_{lower}$, the CFA-image-processing software 140 may apply the $can_{135L}$ to a filter, such as the four-tap filter of equation (25). Assuming the four-tap filter of equation (25), the $\overline{FCC}_{lower}$ may be expressed as and solved using:

$$\overline{FCC}_{lower} = i_1 a_{r-1,c-2} + i_2 a_{r,c-1} + i_3 a_{r+1,c} + i_4 a_{r+2,c+1}) \quad (22)$$

After calculating the selecting the $\overline{FCC}_{lower}$, the CFA-image-processing software 140 may calculate a ratio of an average difference between (i) the first color channel of the lower-candidate population, $FCC_{LCP}$, and (ii) the corresponding-color channel or $CCC_{LCP}$ of the lower-candidate population, $(\overline{FCC_{LCP} - CCC_{LCP}})_{lower}$. The $(\overline{FCC_{LCP} - CCC_{LCP}})_{lower}$ may be expressed as and solved using:

$$(\overline{FCC_{LCP} - CCC_{LCP}})_{lower} = 0.5(a_{r+1,c} - a_{r+2,c}) + 0.5(a_{r,c-1} - a_{r,c-2}) \quad (23)$$

After determining the $(\overline{FCC_{LCP} - CCC_{LCP}})_{lower}$, the CFA-image-processing software 140 may determine an estimate of the corresponding-color channel of the lower-candidate population, $CCC_{lower}$, as follows:

$$CCC_{lower} = \overline{FCC}_{lower} - (\overline{FCC_{LCP} - CCC_{LCP}})_{lower} \quad (24)$$

After making these calculations, the CFA-image-processing software 140 may determine which, if any, of the $can_{135U}$ or $can_{135I}$ indicates a similarity to the corresponding-color channel of the pixel 119$_{r,c}$. The CFA-image-processing software 140 may facilitate this by calculating upper and lower similarity functions, $S_{upper}$ and $S_{lower}$, respectively. The $S_{upper}$ and $S_{lower}$ may be expressed and solved using:

$$S_{upper} = |a_{r,c} - CCC_{upper}| \text{ and } S_{lower} = |a_{r,c} - CCC_{lower}| \quad (25)\text{-}(26)$$

After calculating the $S_{upper}$ and $S_{lower}$, the CFA-image-processing software 140 may adjudge the $S_{upper}$ and $S_{lower}$ to first determine whether either of the $can_{135U}$ or $can_{135I}$ indicates a similarity to the corresponding-color channel of the pixel 119$_{r,c}$. To do this, the CFA-image-processing software 140 may evaluate a similarity-discriminator function, SDF. The SDF may be expressed as and solved using:

$$SDF = \begin{cases} \text{if } |S_{upper} - S_{lower}| \leq \tau_2, \text{ then } SDF = \text{null} \\ \text{else if } S_{upper} < S_{lower}, \text{ then } SDF = \text{upper} \\ \text{else if } S_{upper} > S_{lower}, \text{ then } SDF = \text{lower} \end{cases} \quad (27)$$

where: $\tau_2$ is a given threshold. This given threshold may be formed as a function of bit depths of the 119$_{r,c}$; and may be approximately zero (null) if normalized.

Responsive to evaluating the SDF, the CFA-image-processing software 140 may select (i) the $can_{135DBL1}$ when SDF=null (i.e., when neither $can_{135U}$ nor $can_{135I}$ indicates the similarity to the corresponding-color channel of the pixel 119$_{r,c}$), (ii) the $can_{135U}$ when the SDF=upper (i.e., when the $can_{135U}$ indicates the similarity to the corresponding-color channel of the pixel 119$_{r,c}$) or (iii) the $can_{135L}$ when the SDF=lower (i.e., when the $can_{135I}$ indicates the similarity to the corresponding-color channel of the pixel 119$_{r,c}$).

One skilled in the art may easily modify equations (16)-(17) for selecting the $can_{45U}$, $can_{45L}$, or $can_{45DBL1}$. For ease of exposition, each of the $can_H$, $can_V$, $can_{45U}$, $can_{45L}$, $can_{135U}$, and $can_{135L}$, may be referred to herein, generically, as the single-dataset candidate; and each of the $can_{FLAT\_DBL}$, $can_{45DBL}$ and $can_{135DBL}$ may be referred to herein, generically, as the double-dataset candidate.

After selecting the single-dataset candidate or the double-dataset candidate in accordance with the edge indicator $g_{r,c}$ for the pixel 119$_{r,c}$, the CFA-image-processing software 140 may apply the FCC filter to obtain the first color channel for the pixel 119$_{r,c}$. Assuming that the FCC filter is the four-tap filter of equation (17), the CFA-image-processing software 140 may apply, for the single-subset candidates $can_{H1}$, $can_{V1}$, $can_{45U}$, $can_{45L}$, $can_{135U}$ and $can_{135L}$, the FCC filter to obtain the first-interim-data point $b_{r,c}$ as follows:

$$b_{r,c} = i_1 v_1 + i_2 v_2 + i_3 v_3 + i_4 v_4 + HF_{sd} \quad (28)$$

where: $[v_1, v_2, v_3, v_4]$=single-dataset candidate from TABLE 1, and $HF_{sd}$ is a high-frequency component for the single-dataset candidate. The high-frequency component may be calculated based on a residual value of current colors of neighborhood pixels $119_{r-n, c-n} \ldots 119_{r+n, c+n}$. This high-frequency component, which is described in more detail below, may be defined as follows:

$$HF_{sd} = \begin{cases} \frac{2 * a_{r,c} - a_{r,c-2} - a_{r,c+2}}{4}; & \text{if } HF < \delta \text{ and horizontal} \\ \frac{2 * a_{r,c} - a_{r-2,a} - a_{r+2,c}}{4}; & \text{if } HF < \delta \text{ and vertical} \\ 0; & \text{otherwise} \end{cases} \quad (29)$$

By way of example, the CFA-image-processing software 140 may obtain the first color channel for the pixel $119_{r,c}$ using $can_{H1}$ as follows:

$$b_{r,c} = -\frac{1}{16}a_{r,c-3} + \frac{9}{16}a_{r,c-1} + \frac{9}{16}a_{r,c+1} - \frac{1}{16}a_{r,c+3} + HF_{sd} \quad (EX\ 1)$$

For the double-subset candidates $can_{45DLB1}$, $can_{135DBL1}$ and $can_{FLAT\_DBL1}$, the CFA-image-processing software 140 may apply the FCC filter to obtain the first-interim-data point $b_{r,c}$ as follows:

$$b_{r,c} = \frac{w_2}{w_1 + w_2} can_1 + \frac{w_1}{w_1 + w_2} can_2 + HF_{dd} \quad (30)$$

where:

$$w_1 = \sum_{i=1}^{4} |v_{1,i} - can_1| \text{ and } w_2 = \sum_{i=1}^{4} |v_{2,i} - can_2|; \quad (31)$$

$$can_1 = i_1 v_{11} + i_2 v_{22} + i_3 v_{13} + i_4 v_{14}; \quad (32)$$
$$can_2 = i_1 v_{21} + i_2 v_{22} + i_3 v_{23} + i_4 v_{24};$$

$[v_{11}, v_{12}, v_{13}, v_{14}]$=first of double-dataset candidate from TABLE 1;

$[v_{21}, v_{22}, v_{23}, v_{24}]$=second of double-dataset candidate from TABLE 1; and the $HF_{dd}$ is the high-frequency component, which is described in more detail below and may be defined as follows:

$$HF_{dd} = \begin{cases} \frac{2 * a_{r,c} - a_{r-2,c+2} - a_{r+2,c-2}}{4}; & \text{if } HF < \delta \text{ and } 45° \\ \frac{2 * a_{r,c} - a_{r-2,c-2} - a_{r+2,c+2}}{4}; & \text{if } HF < \delta \text{ and } 45° \\ 4 * a_{r,c} - a_{r,c-2} - \\ \frac{a_{r,c+2} - a_{r-2,c} - a_{r+2,c}}{8}; & \text{if } HF < \delta \text{ and flat} \\ 0; & \text{otherwise} \end{cases} \quad (33)$$

After obtaining the first color channel for the pixel $119_{r,c}$, the CFA-image-processing software 140 may populate the first-interim-data set 150 with the first-interim-data point $b_{r,c}$. This way, after performing the equations (17)-(33) for each pixel of the second-CFA-color-pixel and third-CFA-color-pixel sets 204, 206, as appropriate, the first-interim-data set 150 defines a color plane for the first color channel ("first-color plane"). That is, each of the first-interim-data points $b_{1,1} \ldots b_{8,8}$ may include a contribution from the first color channel. As such, the first-interim-data points $b_{1,1} \ldots b_{8,8}$ include (i) the first/second-color-data set $B_1$, and (ii) the first/third-color-data set $B_2$.

After process block 410, the flow 400 may transition to process block 412. At the process block 412, the processing platform 104, via the CFA-image-processing software 140, may interpolate the second and third color channels as a function of the orientation map 148 and the fourth-pixel set so as to form an interpolated-pixel set as represented by the interpolated-data set 158. The CFA-image-processing software 140 may form the interpolated-pixel set in one or more stages. For simplicity of exposition, however, the following describes the CFA-image-processing software 140 forming the interpolated-pixel set using more than one stage.

At a first stage, the CFA-image-processing software 140 forms the second-interim-data set 152. To facilitate forming the second-interim-data set 152, the CFA-image-processing software 140 may initially populate the second-interim-data set 152 with the first-interim-data set 150. This way, the second-interim-data points $c_{1,1} \ldots c_{8,8}$ initially map to the first-CFA-color-data set, first/second-color-data set and first/third-color-data set $A_1$, $B_1$ and $B_2$.

After populating the second-interim-data set 152, the CFA-image-processing software 140 may (i) interpolate the second color channel for any of the first-CFA-color-pixel set 202 using first/second-color-data set $B_1$; and (ii) populate the second-interim-data set 150 corresponding to the first-CFA-color-data set $A_1$ with data representative of the second color channel for the first-CFA-color-pixel set 202 so interpolated.

The CFA-image-processing software 140 typically interpolates the second color channel for each pixel of the first-CFA-color-pixel set 202. The CFA-image-processing software 140 may, however, interpolate the second color channel for less than all pixels of the first-CFA-color-pixel set 202. For any given pixel $119_{r,c}$ of the first-CFA-color-pixel set 202, the CFA-image-processing software 140 may interpolate it as follows.

The CFA-image-processing software 140 may first obtain, from the edge indicators $g_{1,1} \ldots g_{8,8}$, the edge indicator $g_{r,c}$ corresponding to the pixel $119_{r,c}$. After obtaining the edge indicator $g_{r,c}$, the CFA-image-processing software 140 may then select, as a function of the edge indicator $g_{r,c}$, a filter ("SCC filter") for estimating the second color channel at the pixel $119_{r,c}$.

The SCC filter may be adapted to estimate the second color channel as a function of a second gradient formed from one or more of the first/second-color-pixel set that are disposed in the edge boundary indicated by the edge indicator $g_{r,c}$. The SCC filter, and in turn, the second gradient may be formed as a function of (i) a single-subset candidate of the first/second-color-pixel set that are disposed in the edge boundary or (ii) a double-subset candidate of the first/second-color-pixel set that are disposed in the edge boundary. Table 2, below, includes a list of possible orientations of the edge indicator $g_{r,c}$; and for each of the possible orientations, (i) a possible single-subset candidates or (ii) a possible double-subset candidate for forming the SCC filter.

TABLE 2

| Edge Indicator | Single-Subset Candidate(s) | Double-Subset Candidates |
| --- | --- | --- |
| $h_0$ | $\{b_{r,c-3}\ b_{r,c-1}\ b_{r,c+1}\ b_{r,c+3}\}$ | N/A |
| $h_{90}$ | N/A | $\{b_{r-2,c-1}\ b_{r-2,c-1}\ b_{r+2,c-1}\}$ $\{b_{r-2,c+1}\ b_{r-2,c+1}\ b_{r+2,c+1}\}$ |

TABLE 2-continued

| Edge Indicator | Single-Subset Candidate(s) | Double-Subset Candidates |
|---|---|---|
| $h_{45}$ | N/A | $\{b_{r-2,c+1}\ b_{r,c-1}\ b_{r+2,c-3}\}$ $\{b_{r-2,c+3}\ b_{r,c+1}\ b_{r+2,c-1}\}$ |
| $h_{135}$ | N/A | $\{b_{r-2,c-1}\ b_{r,c+1}\ b_{r+2,c+3}\}$ $\{b_{r-2,c-3}\ b_{r,c-1}\ b_{r+2,c+1}\}$ |
| $h_f$ | N/A | $\{b_{r-2,c-1}\ b_{r,c-1}\ b_{r+2,c-1}\}$ $\{b_{r-2,c+1}\ b_{r,c+1}\ b_{r+2,c+1}\}$ |

In accord with the Table 2, when the edge indicator $g_{r,c}$ is indicative of the horizontal orientation, $h_0$, the SCC filter may be formed as a function of the single-subset candidate shown in Table 2, second row, second column, namely, a second horizontal-dataset candidate, $can_{H2}$. When the edge indicator $g_{r,c}$ is indicative of the vertical orientation, $h_{90}$, the SCC filter may be formed as a function of the double-subset candidate shown in Table 2, third row, third column, namely, a first vertical-double-dataset candidate, $can_{V\_DBL1}$. When the edge indicator $g_{r,c}$ is indicative of the flat orientation, $h_f$, the SCC filter may be formed as a function of the double-subset candidate shown in Table 2, sixth row, third column, namely, a second flat-subset candidate, $can_{FLAT\_DBL2}$.

Alternatively, when the edge indicator $g_{r,c}$ is indicative of is indicative of the 45-deg orientation, $h_{45}$, the SCC filter may be formed as a function of the double-subset candidate shown in Table 2, fourth row, third column, namely, a second 45-double-dataset candidate, $can_{45DLB2}$. Analogously, when the edge indicator $g_{r,c}$ is indicative of is indicative of the 135-deg orientation, $h_{135}$, the SCC filter may be formed as a function of the double-subset candidate shown in Table 2, fifth row, third column, namely, a second 135-double-dataset candidate, $can_{135DBL2}$.

After selecting the single-dataset candidate or the double-dataset candidate in accordance with the edge indicator $g_{r,c}$ for the pixel $119_{r,c}$, the CFA-image-processing software 140 may apply the SCC filter to obtain the second color channel for the pixel $119_{r,c}$. Assuming that the SCC filter is the four-tap filter of equation (25), the CFA-image-processing software 140 may apply, for the single-subset candidate $can_{H2}$, the FCC filter to obtain the second-interim-data point $c_{r,c}$ as follows:

$$j_{r,c} = i_1 v_1 + i_2 v_2 + i_3 v_3 + i_4 v_4 \tag{34}$$

and $$c_{r,c} = b_{r,c} - j_{r,c} \tag{35}$$

where: $[v_1,v_2,v_3,v_4]$=single-dataset candidate from TABLE 2. By way of example, the CFA-image-processing software 140 may obtain the second color channel for the pixel $119_{r,c}$ for the $can_{H2}$ as follows:

$$j_{r,c} = i_1 b_{r,c-3} + i_2 b_{r,c-1} + i_3 b_{r,c+1} + i_4 b_{r,c+3}$$

and $$c_{r,c} = b_{r,c} - j_{r,c} \tag{EX 2}$$

For the double-dataset candidates $can_{V\_DBL1}$, $can_{45DLB2}$, $can_{135DBL2}$ and $can_{FLAT\_DBL2}$, the SCC filter may be a three-tap filter, such as:

$$k = [k_1\ k_2\ k_3] \tag{36}$$

Assuming the three-tap filter of equation (44), the CFA-image-processing software 140 may apply the SCC filter to obtain the second-interim-data point $c_{r,c}$ for the $can_{V\_DBL1}$, $can_{45DLB2}$, and $can_{135DBL2}$ as follows:

$$j_{r,c} = \frac{w_2}{w_1 + w_2} can_1 + \frac{w_1}{w_1 + w_2} can_2 \tag{37}$$

where:

$$w_1 = \sum_{i=1}^{3} |v_{1,i} - can_1| \text{ and } w_2 = \sum_{i=1}^{3} |v_{2,i} - can_2|; \tag{38}$$

$$can_1 = k_1 v_{11} + k_2 v_{12} + k_3 v_{13}; \tag{39}$$
$$can_2 = k_1 v_{21} + k_2 v_{22} + k_3 v_{23};$$

$[v_{11},v_{12},v_{13}]$=first of double-dataset candidate from TABLE 2;
$[v_{21},v_{22},v_{23}]$=second of double-dataset candidate from TABLE 2; and $$c_{r,c} = b_{r,c} - j_{r,c} \tag{40}$$

For the $can_{FLAT\_DBL2}$, the CFA-image-processing software 140 may apply the SCC filter to obtain the second-interim-data point $c_{r,c}$ as follows:

$$j_{r,c} = \begin{cases} \dfrac{w_2}{w_1 + w_2} can_1 + \dfrac{w_1}{w_1 + w_2} can_2; \text{ if } |w_2 - w_1| > \tau_3 \\ \dfrac{b_{r,c-1} - b_{r,c+1}}{2}; \text{ else} \end{cases} \tag{41}$$

where:
$\tau_3$ is a given threshold;

$$w_1 = |2 * b_{r,c-1} - b_{r-2,c-1} - b_{r+2,c-1}| \tag{42}$$

and $$w_2 = |2 * b_{r,c+1} - b_{r-2,c+1} - b_{r+2,c+1}|;$$

$$can_1 = k_1 v_{11} + k_2 v_{12} + k_3 v_{13};$$

$$can_2 = k_1 v_{21} + k_2 v_{22} + k_3 v_{23} \tag{43}$$

$[v_{11},v_{12},v_{13}]$=first of double-dataset candidate from TABLE 2;
$[v_{21},v_{22},v_{23}]$=second of double-dataset candidate from TABLE 2; and $$c_{r,c} = b_{r,c} - j_{r,c} \tag{44}$$

After obtaining the second color channel for the pixel $119_{r,c}$, the CFA-image-processing software 140 may populate the second-interim-data set 152 with the second-interim-data point $c_{r,c}$. This way, after performing the equations (34)-(44) for each pixel of the first-CFA-color-pixel set 202, as appropriate, each of the second-interim-data points $c_{1,1} \ldots c_{8,8}$ corresponding to the first-CFA-color-pixel set 202 may include a contribution from the second color channel. As such, the second-interim-data points $c_{1,1} \ldots c_{8,8}$ include (i) the expanded first/second-color-data set, $C_1$, and (ii) the first/third-color-data set $B_2$. The expanded first/second-color-data set, $C_1$, includes the first/second-color-data set, $B_1$, and the second-interim-data points $c_{1,1} \ldots c_{8,8}$ corresponding to the first-CFA-color-pixel set 202 interpolated in the first stage.

After the first stage, the CFA-image-processing software 140 may perform a second stage of interpolation to form the third-interim-data set 154. To facilitate forming the third-interim-data set 154, the CFA-image-processing software 140 may initially populate the third-interim-data set 154 with the second-interim-data set 152. This way, the third-interim-data points $d_{1,1} \ldots d_{8,8}$ initially map to a remaining portion of the first-CFA-color-data set, $A_1$, the expanded first/second-color-data set, $C_1$, and the first/third-color-data set, $B_2$.

After populating the third-interim-data set 154, the CFA-image-processing software 140 may (i) interpolate the third color channel for any of the remaining portion of the first-CFA-color-pixel set 202 using first/third-color-data set $B_2$; and (ii) populate the third-interim-data set 154 corresponding to the remaining portion of the first-CFA-color-pixel set 202 with data representative of the third color channel for the first-CFA-color-pixel set 202 so interpolated.

The CFA-image-processing software 140 typically interpolates the third color channel for each pixel of the remaining portion of the first-CFA-color-pixel set 202. The CFA-image-processing software 140 may, however, interpolate the third color channel for less than all pixels of the remaining portion of the first-CFA-color-pixel set 202. For any given pixel 119$_{r,c}$ of the remaining portion of the first-CFA-color-pixel set 202, the CFA-image-processing software 140 may interpolate it as follows.

The CFA-image-processing software 140 may first obtain, from the edge indicators $g_{1,1} \ldots g_{8,8}$, the edge indicator $g_{r,c}$ corresponding to the pixel 119$_{r,c}$. After obtaining the edge indicator $g_{r,c}$, the CFA-image-processing software 140 may then select, as a function of the edge indicator $g_{r,c}$, a filter ("TCC filter") for estimating the third color channel at the pixel 119$_{r,c}$.

The TCC filter may be adapted to estimate the third color channel as a function of a third gradient formed from one or more of the first/third-color-pixel set that are disposed in the edge boundary indicated by the edge indicator $g_{r,c}$. The TCC filter, and in turn, the third gradient may be formed as a function of (i) a single-subset candidate of the first/third-color-pixel set that are disposed in the edge boundary or (ii) a double-subset candidate of the first/third-color-pixel set that are disposed in the edge boundary. Table 3, below, includes a list of possible orientations of the edge indicator $g_{r,c}$; and for each of the possible orientations, (i) a possible single-subset candidate or (ii) a possible double-subset candidate for forming the TCC filter.

TABLE 3

| Edge Indicator | Single-Subset Candidate(s) | Double-Subset Candidate |
|---|---|---|
| $h_0$ | N/A | $\{C_{r-1,c-2}\ C_{r-1,c}\ C_{r-1,c+2}\}$ $\{C_{r+1,c-2}\ C_{r+1,c}\ C_{r+1,c+2}\}$ |
| $h_{90}$ | $\{C_{r-3,c}\ C_{r-1,c}\ C_{r+1,c}\ C_{r+3,c}\}$ | N/A |
| $h_{45}$ | N/A | $\{C_{r-3,c+2}\ C_{r-1,c}\ C_{r+1,c-2}\}$ $\{C_{r-1,c+2}\ C_{r+1,c}\ C_{r+3,c-2}\}$ |
| $h_{135}$ | N/A | $\{C_{r-3,c-2}\ C_{r-1,c}\ C_{r+1,c+2}\}$ $\{C_{r-1,c-2}\ C_{r+1,c}\ C_{r+3,c+2}\}$ |
| $h_f$ | N/A | $\{C_{r-1,c-2}\ C_{r-1,c}\ C_{r-1,c+2}\}$ $\{C_{r+1,c-2}\ C_{r+1,c}\ C_{r+1,c+2}\}$ |

In accord with the Table 3, when the edge indicator $g_{r,c}$ is indicative of the horizontal orientation, $h_0$, the TCC filter may be formed as a function of the double-subset candidate shown in Table 3, second row, third column, namely, a first horizontal-double-dataset-candidate, $can_{H\_DBL1}$. When the edge indicator $g_{r,c}$ is indicative of the vertical orientation, $h_{90}$, the TCC filter may be formed as a function of the single-subset candidate shown in Table 3, third row, second column, namely, a second vertical-dataset candidate, $can_{V2}$. When the edge indicator $g_{r,c}$ is indicative of the flat orientation, $h_f$, the TCC filter may be formed as a function of the double-subset candidate shown in Table 3, sixth row, third column, namely, a third flat-subset candidate, $can_{FLAT\_DBL3}$.

When the edge indicator $g_{r,c}$ is indicative of is indicative of the 45-deg orientation, $h_{45}$, the TCC filter may be formed as a function of the double-subset candidate shown in Table 3, fourth row, third column, namely, a third 45-double-dataset candidate, $can_{45DLB3}$. Analogously, when the edge indicator $g_{r,c}$ is indicative of is indicative of the 135-deg orientation, $h_{135}$, the TCC filter may be formed as a function of the double-subset candidate shown in Table 3, fifth row, third column, namely, a third 135-double-dataset candidate, $can_{135DBL3}$.

After selecting the single-dataset candidate or the double-dataset candidate in accordance with the edge indicator $g_{r,c}$ for the pixel 119$_{r,c}$, the CFA-image-processing software 140 may apply the TCC filter to obtain the third color channel for the pixel 119$_{r,c}$. Assuming that the TCC filter is the four-tap filter of equation (17), the CFA-image-processing software 140 may apply, for the single-dataset candidate, $can_{V2}$, the TCC filter to obtain the third-interim-data point $d_{r,c}$ as follows:

$$m_{r,c} = i_1 v_2 + i_2 v_2 + i_3 v_3 + i_4 v_4 \quad (45)$$

and $$d_{r,c} = c_{r,c} - m_{r,c} \quad (46)$$

where: $[v_1, v_2, v_3, v_4]$ = single-dataset candidate from TABLE 3. By way of example, the CFA-image-processing software 140 may obtain the third color channel for the pixel 119$_{r,c}$ for the $can_{V2}$ as follows:

$$m_{r,c} = i_1 c_{r-3,c} + i_2 c_{r-1,c} + i_4 c_{r+1,c} + i_4 c_{r+3,c};$$

and $$d_{r,c} = c_{r,c} - m_{r,c} \quad (EX\ 3)$$

For the double-dataset candidates $can_{H\_DBL1}$, $can_{45DLB3}$, $can_{135DBL3}$ and $can_{FLAT\_DBL3}$, the TCC filter may be a three-tap filter, such as:

$$n = [n_1\ n_2\ n_3] \quad (47)$$

Assuming the three-tap filter of equation (55), the CFA-image-processing software 140 may apply the TCC filter to obtain the third-interim-data point $d_{r,c}$ for the $can_{H\_DBL1}$, $can_{45DLB3}$ and $can_{135DBL3}$ as follows:

$$m_{r,c} = \frac{w_2}{w_1 + w_2} can_1 + \frac{w_1}{w_1 + w_2} can_2 \quad (48)$$

where:

$$w_1 = \sum_{i=1}^{3} |v_{1,i} - can_1| \text{ and } w_2 = \sum_{i=1}^{3} |v_{2,i} - can_2|; \quad (49)$$

$$can_1 = n_1 v_{11} + n_2 v_{12} + n_3 v_{13}; \quad (50)$$
$$can_2 = n_1 v_{21} + n_2 v_{22} + n_3 v_{23};$$

[$v_{11},v_{12},v_{13}$]=first of double-dataset candidate from TABLE 3;

[$v_{21},v_{22},v_{23}$]=second of double-dataset candidate from TABLE 3; and $$d_{r,c}=c_{r,c}-m_{r,c} \quad (51)$$

For the $can_{FLAT\_DBL3}$, the CFA-image-processing software 140 may apply the TCC filter to obtain the third-interim-data point $d_{r,c}$ as follows:

$$m_{r,c} = \begin{cases} \frac{w_2}{w_1+w_2}can_1 + \frac{w_1}{w_1+w_2}can_2; \text{ if } |w_1-w_2|>\tau_4 \\ \frac{c_{r-1,c}-c_{r+1,c}}{2}; \text{else} \end{cases} \quad (52)$$

where:

$\tau_4$ is a given threshold;

$$w_1 = |2*c_{r-1,c}-c_{r-1,c-2}-b_{r-12,c+2}| \text{ and } w_2 = |2*c_{r+1,c}-c_{r+1,c}-c_{r-1,c+2}| \quad (53)$$

$can_1 = n_1v_{11}+n_2v_{12}+n_3v_{13}$;

$can_2 = n_1v_{21}+n_2v_{22}+n_3v_{23} \quad (54)$

[$v_{11},v_{12},v_{13}$]=first of double-dataset candidate from TABLE 3;

[$v_{21},v_{22},v_{23}$]=second of double-dataset candidate from TABLE 3; and $$d_{r,c}=c_{r,c}-m_{r,c} \quad (55)$$

After obtaining the third color channel for the pixel 119$_{r,c}$, the CFA-image-processing software 140 may populate the third-interim-data set 154 with the third-interim-data point $d_{r,c}$. This way, after performing the equations (45)-(55) for each pixel of the remaining portion of the first-CFA-color-pixel set 202, as appropriate, each of the third-interim-data points $d_{1,1} \ldots d_{8,8}$ corresponding to such first-CFA-color-pixel set 202 may include a contribution from the third color channel. As such, the third-interim-data points $d_{1,1} \ldots d_{8,8}$ include (i) the expanded first/second-color-data set, $C_1$, and (ii) an expanded first/third-color-data set, $D_1$.

The expanded first/third-color-data set, $D_1$, includes the first/third-color-data set, $B_2$, and the third-interim-data points $d_{1,1} \ldots d_{8,8}$ corresponding to the remaining portion of the first-CFA-color-pixel set 202 interpolated in the second stage. Like the first/third-color-data set, $B_2$, the expanded first/third-color-data set, $D_1$, when rendered, causes the first/third-color-pixel set to be colored according to (i) the third color channel and an estimate of the first color channel, and/or (ii) the first color channel and an estimate of the third color channel.

After the second stage, the CFA-image-processing software 140 performs a third stage of interpolation to form the fourth-interim-data set 156. To facilitate forming the fourth-interim-data set 156, the CFA-image-processing software 140 may initially populate the fourth-interim-data set 156 with the third-interim-data set 154. This way, the fourth-interim-data points $e_{1,1} \ldots e_{8,8}$ initially map to the expanded first/second-color-data set, $C_1$, and the expanded first/third-color-data set, $D_1$.

After populating the fourth-interim-data set 156, the CFA-image-processing software 140 may (i) interpolate the second color channel for any of the first/third-color-pixel set using first/second-color-data set, $C_1$; and (ii) populate the fourth-interim-data set 156 corresponding to the expanded first/third-color-data set, $D_1$, with data representative of the second color channel for the first/third-color-pixel set so interpolated.

The CFA-image-processing software 140 typically interpolates the second color channel for each pixel of the first/third-color-pixel set. The CFA-image-processing software 140 may, however, interpolate the second color channel for less than all pixels of the first/third-color-pixel set. For any given pixel 119$_{r,c}$ of the first/third-color-pixel set, the CFA-image-processing software 140 may interpolate it as follows.

The CFA-image-processing software 140 may first obtain, from the edge indicators $g_{1,1} \ldots g_{8,8}$, the edge indicator $g_{r,c}$ corresponding to the pixel 119$_{r,c}$. After obtaining the edge indicator $g_{r,c}$, the CFA-image-processing software 140 may then select the SCC filter, as a function of the edge indicator $g_{r,c}$. As noted above, the SCC filter, and in turn, the second gradient may be formed as a function of (i) a single-subset candidate of the first/second-color-pixel set that are disposed in the edge boundary or (ii) a double-subset candidate of the first/second-color-pixel set that are disposed in the edge boundary. Table 4, below, includes a list of possible orientations of the edge indicator $g_{r,c}$; and for each of the possible orientations, (i) a possible single-subset candidate or (ii) a possible double-subset candidate for forming the SCC filter.

TABLE 4

| Edge Indicator | Single-Subset Candidates | Double-Subset Candidates |
|---|---|---|
| $h_0$ | N/A | {$d_{r-1,c-3}$ $d_{r-1,c-1}$ $d_{r-1,c+1}$ $d_{r-1,c+3}$} {$d_{r+1,c-3}$ $d_{r+1,c-1}$ $d_{r+1,c+1}$ $d_{r+1,c+3}$} |
| $h_{90}$ | N/A | {$d_{r-3,c-1}$ $d_{r-1,c-1}$ $d_{r+1,c-1}$ $d_{r+3,c-1}$} {$d_{r-3,c+1}$ $d_{r-1,c+1}$ $d_{r+1,c+1}$ $d_{r+3,c+1}$} |
| $h_{45}$ | {$d_{r-3,c+3}$ $d_{r-1,c+1}$ $d_{r+1,c-1}$ $d_{r+3,c-3}$} | N/A |
| $h_{135}$ | {$d_{r-3,c-3}$ $d_{r-1,c-1}$ $d_{r+1,c=1}$ $d_{r+3,c=3}$} | N/A |
| $h_f$ | N/A | {$d_{r-3,c+3}$ $d_{r-1,c+1}$ $d_{r+1,c-1}$ $d_{r+3,c-3}$} {$d_{r-3,c-3}$ $d_{r-1,c-1}$ $d_{r+1,c=1}$ $d_{r+3,c=3}$} |

In accord with the Table 4, when the edge indicator $g_{r,c}$ is indicative of the horizontal orientation, $h_0$, the SCC filter may be formed as a function of the double-subset candidate shown in Table 4, second row, third column, namely, a second horizontal-double-dataset-candidate, $can_{H\_DBL2}$. When the edge indicator $g_{r,c}$ is indicative of the vertical orientation, $h_{90}$, the SCC filter may be formed as a function of the double-subset candidate shown in Table 4, third row, third column, namely, a second vertical-double-dataset candidate, $can_{V\_DBL2}$. When the edge indicator $g_{r,c}$ is indicative of the flat orientation, $h_f$, the SCC filter may be formed as a function of the double-subset candidate shown in Table 4, sixth row, third column, namely, a fourth flat-subset candidate, $can_{FLAT\_DBL4}$.

When the edge indicator $g_{r,c}$ is indicative of is indicative of the 45-deg orientation, $h_{45}$, the SCC filter may be formed as a function of the single-subset candidate shown in Table 4, fourth row, second column, namely, a second 45-dataset candidate, $can_{45\_2}$. Analogously, when the edge indicator $g_{r,c}$ is indicative of is indicative of the 135-deg orientation, $h_{135}$, the SCC filter may be formed as a function of the single-subset candidate shown in Table 4, fifth row, second column, namely, a second 135-dataset candidate, $can_{135\_2}$.

After selecting the single-dataset candidate or the double-dataset candidate in accordance with the edge indicator $g_{r,c}$ for the pixel 119$_{r,c}$, the CFA-image-processing software 140 may apply the SCC filter to obtain the second color channel for the pixel 119$_{r,c}$. Assuming that the SCC filter is the four-tap filter of equation (17), the CFA-image-processing software 140 may apply, for the single-dataset candidates, $can_{45\_2}$ and $can_{135\_2}$, the SCC filter to obtain the fourth-interim-data point $e_{r,c}$ as follows:

$$p_{r,c} = i_1 v_1 + i_2 v_2 + i_3 v_3 + i_4 v_4 \quad (56)$$

and $$e_{r,c} = d_{r,c} - p_{r,c} \quad (57)$$

where: $[v_1, v_2, v_3, v_4]$ = single-dataset candidate from TABLE 4.

For the $can_{H\_DBL2}$, $can_{V\_DBL2}$ and $can_{FLAT\_DBL4}$, the CFA-image-processing software 140 may apply the SCC filter to obtain the fourth-interim-data point $e_{r,c}$ as follows:

$$p_{r,c} = \frac{w_2}{w_1 + w_2} can_1 + \frac{w_1}{w_1 + w_2} can_2 \quad (58)$$

where:

$$w_1 = \sum_{i=1}^{4} |v_{1,i} - can_1| \text{ and } w_2 = \sum_{i=1}^{4} |v_{2,i} - can_2|; \quad (59)$$

$$can_1 = i_1 v_{11} + i_2 v_{12} + i_3 v_{13} + i_4 v_{14}; \quad (60)$$
$$can_2 = i_1 v_{21} = i_2 v_{22} + i_3 v_{23} + i_4 v_{24};$$

$[v_{11}, v_{12}, v_{13}, v_{14}]$ = first of double-dataset candidate from TABLE 4;

$[v_{21}, v_{22}, v_{23}, v_{24}]$ = second of double-dataset candidate from TABLE 4; and $$e_{r,c} = d_{r,c} - p_{r,c} \quad (61)$$

After obtaining the second color channel for the pixel 119$_{r,c}$, the CFA-image-processing software 140 may populate the fourth-interim-data set 156 with the fourth-interim-data point $e_{r,c}$. This way, after performing the equations (56)-(61) for each pixel of the first/third-color-pixel set, as appropriate, the fourth-interim-data set 156 defines the first-color plane and a color plane for the second color channel ("second-color plane"). That is, each of the fourth-interim-data points $e_{1,1} \ldots e_{8,8}$ may include a contribution from the first and second color channels.

As such, the fourth-interim-data points $e_{1,1} \ldots e_{8,8}$ include (i) the expanded first/second-color-data set, $C_1$, and (ii) data for a set of pixels having contributions from the first, second and third color channels, namely, a first/second/third-color-data set, $E_1$. The first/second/third-color-data set, $E_1$, when rendered, causes the first/second/third-color-pixel set to be colored according to (i) the first color channel and estimates of the second and third color channels, and/or (ii) the third color channel and estimates of the first and second color channels.

After the third stage, the CFA-image-processing software 140 performs a fourth or final stage of interpolation to form the interpolated-data set 158. To facilitate forming the interpolated-data set 158, the CFA-image-processing software 140 may initially populate the interpolated-data set 158 with the fourth-interim-data set 156. This way, the interpolated-data points $f_{1,1} \ldots f_{8,8}$ initially map to the expanded first/second-color-data set, $C_1$, and the first/second/third-color-data set, $E_1$.

After populating the interpolated-data set 158, the CFA-image-processing software 140 may (i) interpolate the third color channel for any of the first/second-color-pixel set using first/third-color-data set, $D_1$; and (ii) populate the interpolated-data set 158 corresponding to the expanded first/second-color-data set, $C_1$, with data representative of the third color channel for the first/second-color-pixel set so interpolated.

The CFA-image-processing software 140 typically interpolates the third color channel for each pixel of the first/second-color-pixel set. The CFA-image-processing software 140 may, however, interpolate the third color channel for less than all pixels of the first/second-color-pixel set. For any given pixel 119$_{r,c}$ of the first/second-color-pixel set, the CFA-image-processing software 140 may interpolate it as follows:

The CFA-image-processing software 140 may first obtain, from the edge indicators $g_{1,1} \ldots g_{8,8}$, the edge indicator $g_{r,c}$ corresponding to the pixel 119$_{r,c}$. After obtaining the edge indicator $g_{r,c}$, the CFA-image-processing software 140 may then select the TCC filter, as a function of the edge indicator $g_{r,c}$. As noted above, the TCC filter, and in turn, the third gradient may be formed as a function of (i) a single-subset candidate of the first/third-color-pixel set that are disposed in the edge boundary or (ii) a double-subset candidate of the first/third-color-pixel set that are disposed in the edge boundary. Table 5, below, includes a list of possible orientations of the edge indicator $g_{r,c}$; and for each of the possible orientations, (i) a possible single-subset candidates or (ii) a possible double-subset candidate for forming the TCC filter.

TABLE 5

| Edge Indicator | Single-Subset Candidates | Double-Subset Candidates |
|---|---|---|
| $h_0$ | N/A | $\{d_{r-1,c-3}\, d_{r-1,c-1}\, d_{r-1,c+1}\, d_{r-1,c+3}\}$ $\{d_{r+1,c-3}\, d_{r+1,c-1}\, d_{r+1,c+1}\, d_{r+1,c+3}\}$ |
| $h_{90}$ | N/A | $\{d_{r-3,c-1}\, d_{r-1,c-1}\, d_{r+1,c-1}\, d_{r+3,c-1}\}$ $\{d_{r-3,c+1}\, d_{r-1,c+1}\, d_{r+1,c+1}\, d_{r+3,c+1}\}$ |
| $h_{45}$ | $\{d_{r-3,c+3}\, d_{r-1,c+1}\, d_{r+1,c-1}\, d_{r+3,c-3}\}$ | N/A |
| $h_{135}$ | $\{d_{r-3,c-3}\, d_{r-1,c-1}\, d_{r+1,c=1}\, d_{r+3,c=3}\}$ | N/A |
| $h_f$ | N/A | $\{d_{r-3,c+3}\, d_{r-1,c+1}\, d_{r+1,c-1}\, d_{r+3,c-3}\}$ $\{d_{r-3,c-3}\, d_{r-1,c-1}\, d_{r+1,c=1}\, d_{r+3,c=3}\}$ |

In accord with the Table 5, when the edge indicator $g_{r,c}$ is indicative of the horizontal orientation, $h_0$, the TCC filter may be formed as a function of the double-subset candidate shown in Table 5, second row, third column, namely, a third horizontal-double-dataset-candidate, $can_{H\_DBL3}$. When the edge indicator $g_{r,c}$ is indicative of the vertical orientation, $h_{90}$, the TCC filter may be formed as a function of the double-subset candidate shown in Table 5, third row, third column, namely, a third vertical-double-dataset candidate, $can_{V\_DBL3}$. When the edge indicator $g_{r,c}$ is indicative of the flat orientation, $h_f$, the TCC filter may be formed as a function of the double-subset candidate shown in Table 5, sixth row, third column, namely, a fifth flat-subset candidate, $can_{FLAT\_DBL5}$.

When the edge indicator $g_{r,c}$ is indicative of is indicative of the 45-deg orientation, $h_{45}$, the TCC filter may be formed as a function of the single-subset candidate shown in Table 5, fourth row, second column, namely, a third 45-dataset candidate, $can_{45\_3}$. Analogously, when the edge indicator $g_{r,c}$ is indicative of is indicative of the 135-deg orientation, $h_{135}$, the TCC filter may be formed as a function of the single-subset candidate shown in Table 5, fifth row, second column, namely, a third 135-dataset candidate, $can_{135\_3}$.

After selecting the single-dataset candidate or the double-dataset candidate in accordance with the edge indicator $g_{r,c}$ for the pixel 119$_{r,c}$, the CFA-image-processing software 140 may apply the TCC filter to obtain the second color channel for the pixel $119_{r,c}$. Assuming that the TCC filter is the four-tap filter of equation (17), the CFA-image-processing software 140 may apply, for the single-dataset candidates, $can_{45\_3}$ and $can_{135\_3}$, the TCC filter to obtain the interpolated-data point $f_{r,c}$ as follows:

$$q_{r,c} = i_1v_1 + i_2v_2 + i_3v_3 + i_4v_4 \qquad (62)$$

and $$f_{r,c} = e_{r,c} - q_{r,c} \qquad (63)$$

where: $[v_1, v_2, v_3, v_4]$=single-dataset candidate from TABLE 5.

For the $can_{H\_DBL3}$, $can_{V\_DBL3}$ and $can_{FLAT\_DBL5}$, the CFA-image-processing software 140 may apply the TCC filter to obtain the interpolated-data point $f_{r,c}$ as follows:

$$q_{r,c} = \frac{w_2}{w_1+w_2} can_1 + \frac{w_1}{w_1+w_2} can_2 \qquad (64)$$

where:

$$w_1 = \sum_{i=1}^{4} |v_{1,i} - can_1| \text{ and } w_2 = \sum_{i=1}^{4} |v_{2,i} - can_2|; \qquad (65)$$

$$can_1 = i_1v_{11} + i_2v_{12} + i_3v_{13} + i_4v_{14}; \qquad (66)$$
$$can_2 = i_1v_{21} + i_2v_{22} + i_3v_{23} + i_4v_{24};$$

$[v_{11}, v_{12}, v_{13}, v_{14}]$=first of double-dataset candidate from TABLE 5;

$[v_{21}, v_{22}, v_{23}, v_{24}]$=second of double-dataset candidate from TABLE 5; and $$f_{r,c} = e_{r,c} - q_{r,c} \qquad (67)$$

After obtaining the third color channel for the pixel $119_{r,c}$, the CFA-image-processing software 140 may populate the interpolated-data set 158 with the interpolated-data point $f_{r,c}$. This way, after performing the equations (62)-(67) for each pixel of the first/second-color-pixel set, as appropriate, the interpolated-data set 158 defines the first-color plane, the second-color plane and a color plane for the third color channel ("third-color plane"). That is, each of the interpolated-data points $f_{1,1} \ldots f_{8,8}$ may include a contribution from the first, second and third color channels. As such, the interpolated-data points $f_{1,1} \ldots f_{8,8}$ include an expanded first/second/third-color-data set or interpolated-data set, $F_1$. The interpolated-data set, $F_1$, when rendered, causes the interpolated-pixel set to be colored according to (i) the first color channel and estimates of the second and third color channels, (ii) the second color channel and estimates of the first and third color channels, and/or (ii) the third color channel and estimates of the first and second color channels.

After completing the final stage at the process block 412, the flow 400 may transition to termination block 414. At the termination block 414, the flow 400 may end. Alternatively, the flow 400 may be repeated periodically, in continuous fashion, or upon being triggered as a result of a condition, such as an impetus for forming one or more demosaiced images.

Although in the foregoing description the equations (9)-(67) assume a square-shaped sample, the equations (9)-(67) may be modified to accommodate other geometric shaped samples, such as hexagonal, triangular, trapezoidal, tetragonal, trapezium, deltoidal, pentagonal, rhomboidal, etc. shaped samples. And although the foregoing description references three and four tap filters, other sized filters may be used in lieu of or in addition to such three and four tap filters.

Example Color Correction

Figure 5:
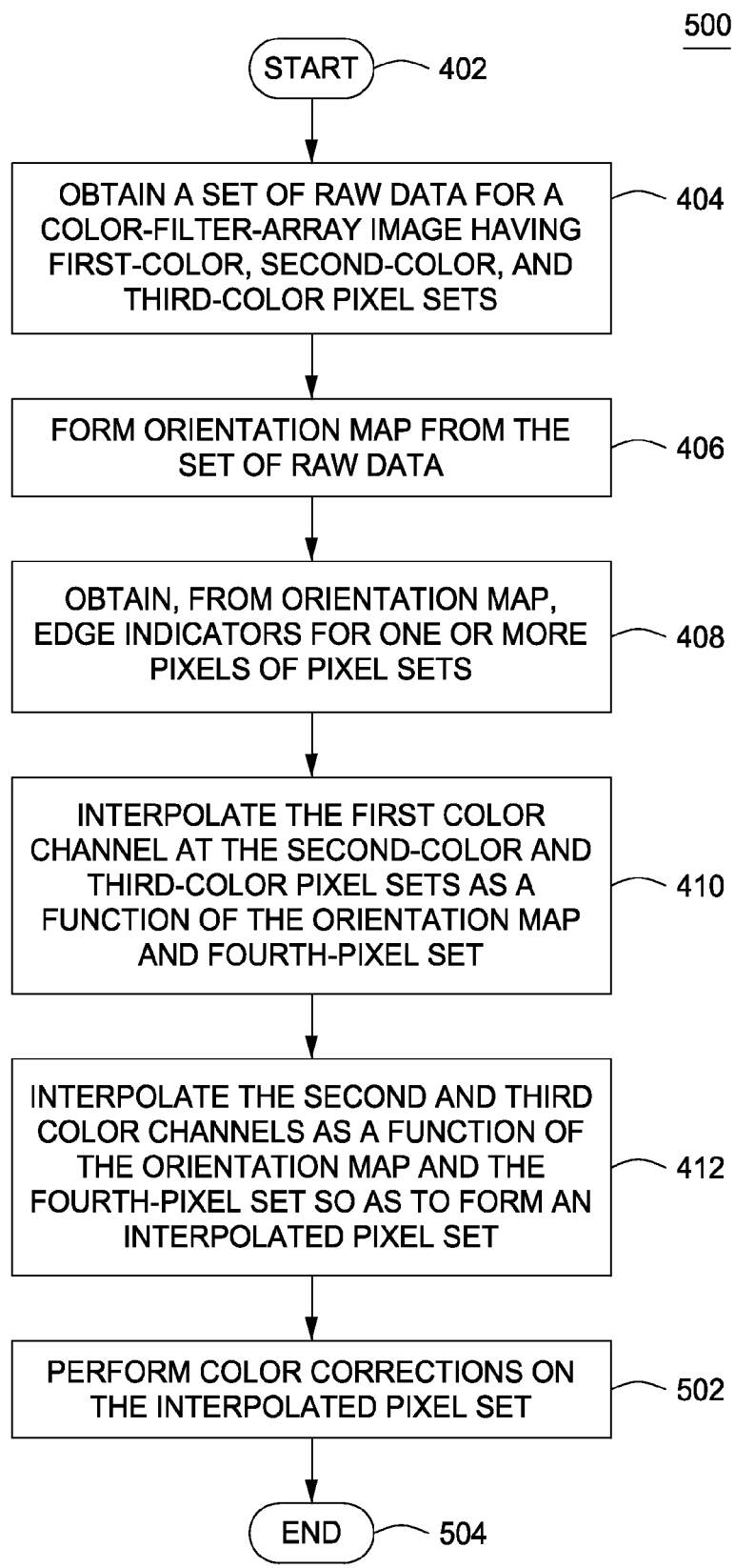
FIG. 5 is a flow diagram illustrating an example flow for performing color correction of a demosaiced image formed from a CFA image.

Referring now to FIG. 5, a flow diagram illustrating an example flow 500 for performing color correction of a demosaiced image formed from a CFA image is shown. The flow 500 of FIG. 5 is similar to the flow 400 of FIG. 4, except as described herein below.

After forming the interpolated-pixel set at process block 412, the processing platform 104, via the CFA-image-processing software 140, may perform color correction to the interpolated-pixel set 158, as shown in process block 502. The CFA-image-processing software 140 may perform the color correction as a function of (i) one or more differences between the first, second and third color planes, and (ii) the orientation map 148. For example, the CFA-image-processing software 140 may, for any given pixel $119_{r,c}$ of the interpolated-data set, $F_1$, perform color correction by determining first, second and third color correction factors, namely, FCC($f_{r,c}$), SCC($f_{r,c}$) and TCC($f_{r,c}$); one for each of the contribution of the first, second and third color channels. The CFA-image-processing software 140 may determine each of the FCC($f_{r,c}$), SCC($f_{r,c}$) and TCC($f_{r,c}$) as follows.

The CFA-image-processing software 140 may first obtain, from the orientation map 148, the edge indicator $g_{r,c}$ for the given pixel $119_{r,c}$. The CFA-image-processing software 140 may then form the FCC($f_{r,c}$), SCC($f_{r,c}$) and TCC($f_{r,c}$) as a function of filtering (e.g., median or linear filtering) of the neighboring pixels $119_{r-n,c-n} \ldots 119_{r+n,c+n}$ disposed in the edge boundary indicated by the edge indicator $g_{r,c}$.

When the edge indicator $g_{r,c}$ is indicative of the horizontal orientation, $h_0$, the CFA-image-processing software 140 may form the FCC($f_{r,c}$), SCC($f_{r,c}$) and TCC($f_{r,c}$) as follow:

$$FCC(f_{r,c}) = \frac{1}{2}[(\overline{fs} + scc(f_{r,c})) + (\overline{ft} + tcc(f_{r,c}))]; \qquad (68)$$

$$SCC(f_{r,c}) = FCC(f_{r,c}) - \overline{fs}; \qquad (69)$$

$$TCC(f_{r,c}) = FCC(f_{r,c}) - \overline{ft}; \qquad (70)$$

$$\overline{fs} = median[fs(f_{r,c-2}), fs(f_{r,c-1}), fs(f_{r,c}), fs(f_{r,c+1}), fs(f_{r,c+2})]; \qquad (71)$$

and $$\overline{ft} = median[ft(f_{r,c-2}), ft(f_{r,c-1}), ft(f_{r,c}), ft(f_{r,c+1}), ft(f_{r,c+2})] \qquad (72)$$

where: $fs(f_{r,c})$ is a difference between the first and second color channels of the given pixel $119_{r,c}$; $fs(f_{r,c-2}), fs(f_{r,c-1}), fs(f_{r,c+1}), fs(f_{r,c+2})$ are respective differences between the first and second color channels of the neighboring pixels $119_{r,c-n} \ldots 119_{r,c+n}$; $ft(f_{r,c})$ is a difference between the first and third color channels of the given pixel $119_{r,c}$; and $ft(f_{r,c-2}), ft(f_{r,c-1}), ft(f_{r,c+1}), ft(f_{r,c+2})$ are respective differences between the first and second color channels of the neighboring pixels $119_{r,c-n} \ldots 119_{r,c+n}$.

When the edge indicator $g_{r,c}$ is indicative of the vertical orientation, $h_{90}$, the CFA-image-processing software 140 may form the FCC($f_{r,c}$), SCC($f_{r,c}$) and TCC($f_{r,c}$) as above, except that:

$$\overline{fs} = median[fs(f_{r-2,c}), fs(f_{r-1,c}), fs(f_{r,c}), fs(f_{r+1,c}), fs(f_{r+2,c})] \qquad (73)$$

and $$\overline{ft} = median[ft(f_{r-2,c}), ft(f_{r-1,c}), ft(f_{r,c}), ft(f_{r+1,c}), ft(f_{r+2,c})] \qquad (74)$$

where: fs $(f_{r-2,c})$, fs$(f_{r-1,c})$, fs$(f_{r+1,c})$, fs$(f_{r+2,c})$ are respective differences between the first and second color channels of the neighboring pixels $119_{r-m,c} \ldots 119_{r+m,c}$; and ft$(f_{r-2,c})$, ft$(f_{r-1,c})$, ft$(f_{r+1,c})$, ft$(f_{r+2,c})$ are respective differences between the first and second color channels of the neighboring pixels $119_{r-m,c} \ldots 119_{r+m,c}$.

When the edge indicator $g_{r,c}$ is indicative of the 45-deg. orientation, $h_{45}$, the CFA-image-processing software 140 may form the FCC($f_{r,c}$), SCC($f_{r,c}$) and TCC($f_{r,c}$) as above, except that:

$$\overline{fs} = \text{median}[fs(f_{r-2,c+2}), fs(f_{r-1,c+1}), fs(f_{r,c}), fs(f_{r+1,c-1}), fs(f_{r+2,c-2})] \quad (75)$$

and $$\overline{ft} = \text{median}[ft(f_{r-2,c+2}), ft(f_{r-1,c+1}), ft(f_{r,c}), ft(f_{r+2,c-2})] \quad (76)$$

where: fs$(f_{r-2,c+2})$, fs$(f_{r-1,c+1})$, fs$(f_{r+1,c-1})$, fs$(f_{r+2,c-2})$ are respective differences between the first and second color channels of the neighboring pixels $119_{r-m,c+n} \ldots 119_{r+m,c-n}$; and ft$(f_{r-2,c+2})$, ft$(f_{r-1,c+1})$, ft$(f_{r+1,c-1})$, ft$(f_{r+2,c-1})$ are respective differences between the first and second color channels of the neighboring pixels $119_{r-m,c+n} \ldots 119_{r+m,c-n}$.

When the edge indicator $g_{r,c}$ is indicative of the 135-deg. orientation, $h_{135}$, the CFA-image-processing software 140 may form the FCC($f_{r,c}$), SCC($f_{r,c}$) and TCC($f_{r,c}$) as above, except that:

$$\overline{fs} = \text{median}[fs(f_{r-2,c-2}), fs(f_{r-1,c-1}), fs(f_{r,c}), fs(f_{r-1,c+1}), fs(f_{r-2,c+2})] \quad (77)$$

and $$\overline{ft} = \text{median}[ft(f_{r-2,c-2}), ft(f_{r-1,c-1}), ft(f_{r,c}), ft(f_{r+1,c+1}), ft(f_{r+2,c+2})] \quad (78)$$

where: fs$(f_{r-2,c-2})$, fs$(f_{r-1,c-1})$, fs$(f_{r+1,c+1})$, fs$(f_{r+2,c+2})$ are respective differences between the first and second color channels of the neighboring pixels $119_{r-m,c-n} \ldots 119_{r+m,c+n}$; and ft$(f_{r-2,c-2})$, ft$(f_{r-1,c-1})$, ft$(f_{r+1,c+1})$, ft$(f_{r+2,c+2})$ are respective differences between the first and second color channels of the neighboring pixels $119_{r-m,c-n} \ldots 119_{r+m,c+n}$.

When the edge indicator $g_{r,c}$ is indicative of the flat orientation, $h_f$, the CFA-image-processing software 140 may form the FCC($f_{r,c}$), SCC($f_{r,c}$) and TCC($f_{r,c}$) as follows. The CFA-image-processing software 140 may first check whether the neighboring pixels $119_{r-n,c-n} \ldots 119_{r+n,c+n}$ are indicative of a horizontal, val$_h$, or vertical preference, val$_v$. To do this, the CFA-image-processing software 140 may first determine:

$$\text{val}_1 = (f(f_{r,c-1}) + f(f_{r,c+1})) \quad (79)$$

and $$\text{val}_1 = (f(f_{r-1,c}) + f(f_{r+1,c})) \quad (80)$$

where: f$(f_{r-1,c})$, f$(f_{r,c+1})$, f$(f_{r-1,c})$, f$(f_{r+1,c})$ are first color channel contributions for the neighboring pixels $119_{r-n,c-n} \ldots 119_{r+n,c+n}$. When the CFA-image-processing software 140 determines that |val$_1$−val$_2$|>τ$_5$ (where τ$_5$ is a given threshold), then the neighboring pixels $119_{r-n,c-n} \ldots 119_{r+n,c+n}$ are indicative of either the horizontal, val$_h$, or vertical preference, val$_v$. When the given pixel $119_{r,c}$ originates from the third-color-pixel set, the CFA-image-processing software 140 may determine the horizontal, val$_h$ and vertical preference, val$_v$, as follows:

$$\text{val}_h = |2 * t(f_{r,c}) - t(f_{r,c-1}) - t(f_{r,c+1})| \quad (81)$$

and $$\text{val}_v = |2 * t(f_{r,c}) - t(f_{r-1,c}) - t(f_{r+1,c})| \quad (82)$$

where: t$(f_{r,c})$ is the third color channel contribution of the given pixel $119_{r,c}$; t$(f_{r,c-1})$, t$(f_{r,c+1})$ are the third color channel contributions of the neighboring pixels $119_{r,c-n} \ldots 119_{r,c+n}$; and t$(f_{r-1,c})$, t$(f_{r-1,c})$ are the third color channel contributions of the neighboring pixels $119_{r,c-n} \ldots 119_{r,c+n}$. After determining the horizontal, val$_h$ and vertical preference, val$_v$, the CFA-image-processing software 140 may determine:

$$TCC(f_{r,c}) = t(f_{r,c}); \quad (83)$$

$$FCC(f_{r,c}) = \begin{cases} -\frac{1}{8}f(f_{r,c-2}) + \frac{5}{8}f(f_{r,c-1}) + \frac{5}{8}f(f_{r,c+1}) + \\ \quad \frac{1}{8}f(f_{r,c+2}); \text{val}_v > (\text{val}_h + \tau_6) \\ -\frac{1}{8}f(f_{r-2,c}) + \frac{5}{8}f(f_{r-1,c}) + \frac{5}{8}f(f_{r+1,c}) + \frac{1}{8}f(f_{r+2,c}); \\ \quad \text{val}_h > (\text{valv} + \tau_6) \\ \frac{1}{2}[(\overline{fs} + scc(f_{r,c})) + (\overline{ft} + tcc(f_{r,c}))]; \text{else} \end{cases} \quad (84)$$

$$\overline{fs} = \begin{cases} fs(f_{r,c-1}); \text{val}_v > (\text{val}_h + \tau_6) \\ fs(f_{r-1,c}); \text{val}_h > (\text{valv} + \tau_6) \\ \text{median}[fs(f_{r,c-2}), fs(f_{r,c-1}), fs(f_{r,c}), fs(f_{r,c+1}), fs(f_{r,c+2})]; \text{else}; \end{cases} \quad (85)$$

$$SCC(f_{r,c}) = FCC(f_{r,c}) - \overline{fs} \quad (86)$$

Where: τ$_6$ is a given threshold.

After determining the FCC($f_{r,c}$), SCC($f_{r,c}$) and TCC($f_{r,c}$), the CFA-image-processing software 140 may apply them to the given pixel $119_{r,c}$. The CFA-image-processing software 140 may, for example, replace the first, second and third color channel contributions of the given pixel $119r,c$ of $f_{r,c}$ with the FCC($f_{r,c}$), SCC($f_{r,c}$) and TCC($f_{r,c}$), respectively. Alternatively, the CFA-image-processing software 140 may combine the first, second and third color channel contributions of the given pixel $119_{r,c}$ of $f_{r,c}$ with the FCC($f_{r,c}$), SCC($f_{r,c}$) and TCC($f_{r,c}$).

After performing the color correction at the process block 502, the flow 500 may transition to termination block 504. At the termination block 504, the flow 500 may end. Alternatively, the flow 500 may be repeated periodically, in continuous fashion, or upon being triggered as a result of a condition, such as an impetus for forming one or more demosaiced images.

Example Digital Zoom

FIG. 6 is a flow diagram illustrating an example flow 600 for performing a digital zoom of a demosaiced image formed from a CFA image. The flow 600 of FIG. 6 is similar to the flow 500 of FIG. 5, except as described herein below.

After forming the interpolated-pixel set at process block 412 or performing color correction at process block 502, the processing platform 104, via the CFA-image-processing software 140, may perform a digital zoom of the interpolated-pixel set 158, as shown in process block 602. To facilitate this, the CFA-image-processing software 140 may first populate the zoom-data set 160 with the interpolated-pixel set 158. Assuming a zoom factor of two, the zoom-data points $z_{1,1} \ldots z_{p,q}$, may map to the interpolated-data points $f_{1,1} \ldots f_{j,k}$, where p and q are both odd.

After populating the zoom-data set 160, the CFA-image-processing software 140 interpolates (i) each of the expanded set of the pixels ("expanded-pixel set") $119_{1,1} \ldots 119_{p,q}$, where p and q are both even ("first expanded-pixel subset"); (ii) each of the expanded set of the pixels $119_{1,1} \ldots 119_{p,q}$, where p is odd and q is even ("second expanded-pixel subset"); and (iii) each of the expanded set of the pixels $119_{1,1} \ldots 119_{p,q}$, where p is even q is odd ("third expanded-pixel subset"). The CFA-image-processing software 140 may interpolate any given expansion pixel $119_{r,c}$ of the first expanded-pixel subset as follows.

The CFA-image-processing software 140 may first repopulate the orientation map 148 to redistribute the edge indicators $g_{1,1} \ldots g_{8,8}$ so that they map to the expanded-pixel set $119_{1,1} \ldots 119_{p,q}$, where p and q are both odd ("fourth expanded-pixel subset"). Thereafter, the CFA-image-processing software 140 may obtain, from the edge indicators $g_{1,1} \ldots g_{p,q}$, the edge indicators $g_{r-1,c-1}$, $g_{r+1,c-1}$, $g_{r-1,c+1}$, $g_{r+1,c+1}$. The CFA-image-processing software 140 may then determine, from the edge indicators $g_{r-1,c-1}$, $g_{r+1,c-1}$, $g_{r-1,c+1}$, $g_{r+1,c+1}$, the edge indicator $g_{r,c}$ for the expansion pixel $119_{r,c}$. The CFA-image-processing software 140 may determine the edge indicator $g_{r,c}$ by:

$$g_{r,c} = \begin{cases} \text{flat; if at least two of } [g_{r-1,c-1}, g_{r+1,c-1}, g_{r-1,c+1}, g_{r+1,c+1}] \text{ are flat} \\ h_0; \text{ if } 0 < \text{mean}[val(g_{r-1,c-1}), val(g_{r+1,c-1}), val(g_{r-1,c+1}), val(g_{r+1,c+1})] < 23° \\ h_{45}; \text{ if } 23 < \text{mean}[val(g_{r-1,c-1}), val(g_{r+1,c-1}), val(g_{r-1,c+1}), val(g_{r+1,c+1})] < 67° \\ h_v; \text{ if } 23 < \text{mean}[val(g_{r-1,c-1}), val(g_{r+1,c-1}), val(g_{r-1,c+1}), val(g_{r+1,c+1})] < 112° \\ h_{135}; \text{ if } 112 < \text{mean}[val(g_{r-1,c-1}), val(g_{r+1,c-1}), val(g_{r-1,c+1}), val(g_{r+1,c+1})] < 157° \end{cases} \quad (87)$$

After determining the edge indicator $g_{r,c}$, the CFA-image-processing software 140 may then select, as a function of the edge indicator $g_{r,c}$, a first-zoom filter ("FZ filter") for estimating the first, second and third color channels at the expansion pixel $119_{r,c}$. The FZ filter may be adapted to estimate the first, second and third color channels as a function of a first-zoom gradient formed from one or more of the fourth expanded-pixel subset.

The FZ filter, and in turn, the first-zoom gradient may be formed as a function of (i) a single-subset candidate of the fourth expanded-pixel set or (ii) a double-subset candidate of the fourth expanded-pixel set. Table 6, below, includes a list of possible orientations of the edge indicator $g_{r,c}$; and for each of the possible orientations, (i) a possible single-subset candidate or (ii) a possible double-subset candidate for forming the FZ filter.

TABLE 6

| Edge Indicator | Single-Subset Candidates | Double-Subset Candidates |
|---|---|---|
| $h_0$ | N/A | $\{Z_{r-1,c-3} Z_{r-1,c-1} Z_{r-1,c+1} Z_{r-1,c+3}\}$ $\{Z_{r+1,c-3} Z_{r+1,c-1} Z_{r+1,c+1} Z_{r+1,c+3}\}$ |
| $h_{90}$ | N/A | $\{Z_{r-3,c-1} Z_{r-1,c-1} Z_{r+1,c-1} Z_{r+3,c-1}\}$ $\{Z_{r-3,c+1} Z_{r-1,c+1} Z_{r+1,c+1} Z_{r+3,c+1}\}$ |
| $h_{45}$ | $\{Z_{r-3,c+3} Z_{r-1,c+1}$ $Z_{r+1,c-1} Z_{r+3,c-3}\}$ | N/A |
| $h_{135}$ | $\{Z_{r-3,c-3} Z_{r-1,c-1}$ $Z_{r+1,c-1} Z_{r+3,c-3}\}$ | N/A |
| $h_f$ | N/A | $\{Z_{r-3,c+3} Z_{r-1,c+1} Z_{r+1,c-1} Z_{r+3,c-3}\}$ $\{Z_{r-3,c-3} Z_{r-1,c-1} Z_{r+1,c+1} Z_{r+3,c+3}\}$ |

In accord with the Table 6, when the edge indicator $g_{r,c}$ is indicative of the horizontal orientation, $h_0$, the FZ filter may be formed as a function of the double-subset candidate shown in Table 6, second row, third column, namely, a fourth horizontal-double-dataset-candidate, $can_{H\_DBL4}$. When the edge indicator $g_{r,c}$ is indicative of the vertical orientation, $h_{90}$, the FZ filter may be formed as a function of the double-subset candidate shown in Table 6, third row, third column, namely, a fourth vertical-double-dataset-candidate, $can_{V\_DBL4}$. When the edge indicator $g_{r,c}$ is indicative of the flat orientation, $h_f$, the FZ filter may be formed as a function of the double-subset candidate shown in Table 6, sixth row, third column, namely, a sixth flat-subset candidate, $can_{FLAT\_DBL6}$.

When the edge indicator $g_{r,c}$ is indicative of is indicative of the 45-deg orientation, $h_{45}$, the FZ filter may be formed as a function of the single-subset candidate shown in Table 6, fourth row, second column, namely, a fourth 45-dataset candidate, $can_{45\_4}$. Analogously, when the edge indicator $g_{r,c}$ is indicative of is indicative of the 135-deg orientation, $h_{135}$, the FZ filter may be formed as a function of the single-subset candidate shown in Table 6, fifth row, second column, namely, a fourth 135-dataset candidate, $can_{135\_4}$.

After selecting the single-dataset candidate or the double-dataset candidate in accordance with the edge indicator $g_{r,c}$ for the expansion pixel $119_{r,c}$, the CFA-image-processing software 140 may apply the FZ filter to obtain the first, second and third color channels for the expansion pixel $119_{r,c}$.

Assuming that the FZ filter is the four-tap filter of equation (17), the CFA-image-processing software 140 may apply, for the single-dataset candidates, $can_{45\_4}$ and $can_{135\_4}$, the FZ filter to obtain the zoom-data point $z_{r,c}$ as follows:

$$s_{r,c} = i_1 v_1 + i_2 v_2 + i_3 v_3 + i_4 v_4 \quad (88)$$

and $$z_{r,c} = z_{r,c} - s_{r,c} \quad (89)$$

where: $[v_1, v_2, v_3, v_4]$=single-dataset candidate from TABLE 6.

For the $can_{H\_DBL4}$, $can_{V\_DBL4}$ and $can_{FLAT\_DBL6}$, the CFA-image-processing software 140 may apply the FZ filter to obtain the zoom-data point $z_{r,c}$ as follows:

$$s_{r,c} = \frac{w_2}{w_1 + w_2} can_1 + \frac{w_1}{w_1 + w_2} can_2 \quad (90)$$

where:

$$w_1 = \sum_{i=1}^{4} |v_{1,i} - can_1| \text{ and } w_2 = \sum_{i=1}^{4} |v_{2,i} = can_2|; \quad (91)$$

$$can_1 = i_1 v_{11} + i_2 v_{12} + i_3 v_{13} + i_4 v_{14}; \quad (92)$$
$$can_2 = i_1 v_{21} + i_2 v_{22} + i_3 v_{23} + i_4 v_{24};$$

$[v_{11}, v_{12}, v_{13}, v_{14}]$=first of double-dataset candidate from TABLE 6;

$[v_{21}, v_{22}, v_{23}, v_{24}]$=second of double-dataset candidate from TABLE 6; and $$z_{r,c} = z_{r,c} - s_{r,c} \quad (93)$$

After obtaining the first, second and third color channels for the expansion pixel $119_{r,c}$, the CFA-image-processing software 140 may populate (i) the zoom-data set 160 with the zoom-data point $z_{r,c}$, and (ii) the orientation map 148 with the edge indicator $g_{r,c}$. This way, after performing the equations (87)-(93) for each pixel of the first expanded-pixel subset, as appropriate, the zoom-data set 160 defines the first, second and third color channels for the first expanded-pixel subset, and the orientation map 148 includes the edge indicators $g_{1,1} \ldots g_{p,q}$ for such first expanded-pixel subset.

After interpolating the first expanded-pixel subset, the CFA-image-processing software 140 may interpolate the second expanded-pixel subset. For any given expansion pixel 119$_{r,c}$ of the second expanded-pixel subset, the CFA-image-processing software 140 may interpolate it as follows.

The CFA-image-processing software 140 may obtain, from the edge indicators $g_{1,1} \ldots g_{p,q}$, the edge indicators $g_{r,c-1}, g_{r+2,c-1}, g_{r,c+1}, g_{r+2,c+1}$. Thereafter, the CFA-image-processing software 140 may then determine, from the edge indicators $g_{r,c-1}, g_{r+2,c-1}, g_{r,c+1}, g_{r+2,c+1}$, the edge indicator $g_{r,c}$ for the expansion pixel 119$_{r,c}$. The CFA-image-processing software 140 may determine the edge indicator $g_{r,c}$ by:

$$g_{r,c} = \begin{cases} \text{flat; if at least two of } [g_{r,c-1}, g_{r+2,c-1}, g_{r,c+1}, g_{r+2,c+1}] \text{ are flat} \\ h_0; \text{if } 0 < \text{mean } [val(g_{r,c-1}), val(g_{r+2,c-1}), val(g_{r,c+1}), val(g_{r+2,c+1})] < 23° \\ h_{45}; \text{if } 23 < \text{mean}[val(g_{r,c-1}), val(g_{r+2,c-1}), val(g_{r,c+1}), val(g_{r+2,c+1})] < 67° \\ h_v; \text{if } 67 < \text{mean}[val(g_{r,c-1}), val(g_{r+2,c-1}), val(g_{r,c+1}), val(g_{r+2,c+1})] < 112° \\ h_{135}; \text{if } 112 < \text{mean}[val(g_{r,c-1}), val(g_{r+2,c-1}), val(g_{r,c+1}), val(g_{r+2,c+1})] < 157° \end{cases} \quad (94)$$

After determining the edge indicator $g_{r,c}$, the CFA-image-processing software 140 may then select, as a function of the edge indicator $g_{r,c}$, a second zoom filter ("SZ filter") for estimating the first, second and third color channels at the expansion pixel 119$_{r,c}$. The SZ filter may be adapted to estimate the first, second and third color channels as a function of a second zoom gradient formed from the expanded-pixel set.

The SZ filter, and in turn, the second zoom gradient may be formed as a function of (i) a single-subset candidate of the expanded-pixel set or (ii) a double-subset candidate of the expanded-pixel set. Table 7, below, includes a list of possible orientations of the edge indicator $g_{r,c}$; and for each of the possible orientations, (i) a possible single-subset candidate or (ii) a possible double-subset candidate for forming the SZ filter.

TABLE 7

| Edge Indicator | Single-Subset Candidates | Double-Subset Candidates |
|---|---|---|
| $h_0$ | $\{Z_{r,c-3} Z_{r,c-1} Z_{r,c+1} Z_{r,c+3}\}$ | N/A |
| $h_{90}$ | $\{Z_{r-2,c} Z_{r-1,c} Z_{r+1,c} (Z_{r+2,c-1}+Z_{r+2,c+1})/2\}$ | N/A |
| $h_{45}$ | N/A | $\{Z_{r-2,c+1} Z_{r-1,c} Z_{r,c-1} Z_{r+1,c-2}\}$ $\{Z_{r-1,c+2} Z_{r,c+1} Z_{r+1,c} Z_{r+2,c-1}\}$ |
| $h_{135}$ | N/A | $\{Z_{r-2,c-1} Z_{r-1,c} Z_{r,c+1} Z_{r+1,c+2}\}$ $\{Z_{r-1,c-2} Z_{r,c-1} Z_{r+1,c} Z_{r+2,c+1}\}$ |
| $h_f$ | N/A | $\{Z_{r,c-3} Z_{r,c-1} Z_{r,c+1} Z_{r,c+3}\}$ $\{Z_{r-2,c} Z_{r-1,c} Z_{r+1,c} (Z_{r+2,c-1}+Z_{r+2,c+1})/2\}$ |

In accord with the Table 7, when the edge indicator $g_{r,c}$ is indicative of the horizontal orientation, $h_0$, the SZ filter may be formed as a function of the single-subset candidate shown in Table 7, second row, second column, namely, a third horizontal-single-dataset-candidate, $\text{can}_{H3}$. When the edge indicator $g_{r,c}$ is indicative of the vertical orientation, $h_{90}$, the SZ filter may be formed as a function of the single-subset candidate shown in Table 7, third row, second column, namely, a third vertical-single-dataset candidate, $\text{can}_{V3}$. When the edge indicator $g_{r,c}$ is indicative of the flat orientation, $h_f$, the SZ filter may be formed as a function of the double-subset candidate shown in Table 7, sixth row, third column, namely, a seventh flat-subset candidate, $\text{can}_{FLAT\_DBL7}$.

When the edge indicator $g_{r,c}$ is indicative of is indicative of the 45-deg orientation, $h_{45}$, the SZ filter may be formed as a function of the double-subset candidate shown in Table 7, fourth row, third column, namely, a fourth 45-double-dataset candidate, $\text{can}_{45\_DBL4}$. Analogously, when the edge indicator $g_{r,c}$ is indicative of is indicative of the 135-deg orientation, $h_{135}$, the SZ filter may be formed as a function of the double-subset candidate shown in Table 7, fifth row, third column, namely, a fourth 135-double-dataset candidate, $\text{can}_{135\_DBL4}$.

After selecting the single-dataset candidate or the double-dataset candidate in accordance with the edge indicator $g_{r,c}$ for the expansion pixel 119$_{r,c}$, the CFA-image-processing software 140 may apply the SZ filter to obtain the first, second and third color channels for such expansion pixel 119$_{r,c}$. For the single-dataset candidates, $\text{can}_{H3}$ and $\text{can}_{V3}$, the CFA-image-processing software 140 may obtain the zoom-data point $z_{r,c}$ by applying the SZ filter in accordance with the equations (17) and (88)-(89), where: $[v_1,v_2,v_3,v_4]$=the single-dataset candidate from the Table 7.

For the $\text{can}_{45\_DBL4}$, $\text{can}_{135\_DBL4}$ and $\text{can}_{FLAT\_DBL7}$, the CFA-image-processing software 140 may obtain the zoom-data point $z_{r,c}$ by applying the SZ filter in accordance with the equations (17) and (90)-(93) where: $[v_{11},v_{12},v_{13},v_{14}]$=is the first of the double-dataset candidate from Table 7, and $[v_{21}, v_{22},v_{23},v_{24}]$=is the second of the double-dataset candidate from Table 7.

After obtaining the first, second and third color channel for the expansion pixel 119$_{r,c}$, the CFA-image-processing software 140 may populate (i) the zoom-data set 160 with the zoom-data point $z_{r,c}$, and (ii) the orientation map 148 with the $g_{r,c}$. This way, after performing the equations (93) and (88)-(93) for each pixel of the second expanded-pixel subset, as appropriate, the zoom-data set 160 defines the first, second and third color channels for the second expanded-pixel subset, and the orientation map 148 includes the edge indicators $g_{1,1} \ldots g_{p,q}$ for such second expanded-pixel subset.

After interpolating the second expanded-pixel set, the CFA-image-processing software 140 may interpolate the third expanded-pixel subset. The CFA-image-processing software 140 may interpolate any given expansion pixel 119$_{r,c}$ of the second expanded-pixel subset as follows.

The CFA-image-processing software 140 may obtain, from the edge indicators $g_{1,1} \ldots g_{p,q}$, the edge indicators $g_{r-1,c}, g_{r+1,c}, g_{r,c-1}, g_{r,c+1}$. Thereafter, the CFA-image-processing software 140 may then determine, from the edge indicators $g_{r-1,c}, g_{r+1,c}, g_{r,c-1}, g_{r,c+1}$, the edge indicator $g_{r,c}$ for the expansion pixel 119$_{r,c}$. The CFA-image-processing software 140 may determine the edge indicator $g_{r,c}$ by:

$$g_{r,c} = \begin{cases} \text{flat; if at least two of } [g_{r-1,c}, g_{r+1,c}, g_{r,c-1}, g_{r,c+1}] \text{ are flat} \\ h_0; \text{ if } 0 < \text{mean } [val(g_{r-1,c}), val(g_{r+1,c}), val(g_{r,c-1}), val(g_{r,c+1})] < 23° \\ h_{45}; \text{ if } 23 < \text{mean}[val(g_{r-1,c}), val(g_{r+1,c}), val(g_{r,c-1}), val(g_{r,c+1})] < 67° \\ h_V; \text{ if } 67 < \text{mean}[val(g_{r-1,c}), val(g_{r+1,c}), val(g_{r,c-1}), val(g_{r,c+1})] < 112° \\ h_{135}; \text{ if } 112 < \text{mean}[val(g_{r-1,c}), val(g_{r+1,c}), val(g_{r,c-1}), val(g_{r,c+1})] < 157° \end{cases} \quad (95)$$

After determining the edge indicator $g_{r,c}$, the CFA-image-processing software 140 may then select, as a function of the edge indicator $g_{r,c}$, a third zoom filter ("TZ filter") for estimating the first, second and third color channels at the expansion pixel $119_{r,c}$. The TZ filter may be adapted to estimate the first, second and third color channels as a function of a third-zoom gradient formed from the expanded-pixel set.

The TZ filter, and in turn, the third-zoom gradient may be formed as a function of (i) a single-subset candidate of the expanded-pixel set or (ii) a double-subset candidate of the expanded-pixel set. Table 8, below, includes a list of possible orientations of the edge indicator $g_{r,c}$; and for each of the possible orientations, (i) a possible single-subset candidate or (ii) a possible double-subset candidate for forming the TZ filter.

TABLE 8

| Edge Indicator | Single-Subset Candidates | Double-Subset Candidates |
|---|---|---|
| $h_0$ | $\{Z_{r,c-1} Z_{r,c+1}\}$ | N/A |
| $h_{90}$ | $\{Z_{r-3,c} Z_{r-1,c} Z_{r+1,c} Z_{r+3,c}\}$ | N/A |
| $h_{45}$ | $\{Z_{r-2,c+1} Z_{r-1,c} Z_{r,c-1} Z_{r+1,c-2}\}$ | N/A |
| $h_{135}$ | $\{Z_{r-2,c-1} Z_{r-1,c} Z_{r,c+1} Z_{r+1,c+2}\}$ | N/A |
| $h_f$ | N/A | $\{Z_{r,c-2} Z_{r,c-1} Z_{r,c+1} (Z_{r-1,c+2} Z_{r+1,c+2})/2\}$ $\{Z_{r-3,c} Z_{r-1,c} Z_{r+1,c} Z_{r+3,c}\}$ |

In accord with the Table 8, when the edge indicator $g_{r,c}$ is indicative of the horizontal orientation, $h_0$, the TZ filter may be formed as a function of the single-subset candidate shown in Table 8, second row, second column, namely, a fourth horizontal-single-dataset-candidate, $can_{H4}$. When the edge indicator $g_{r,c}$ is indicative of the vertical orientation, $h_{90}$, the TZ filter may be formed as a function of the single-subset candidate shown in Table 8, third row, second column, namely, a fourth vertical-single-dataset candidate, $can_{V4}$. When the edge indicator $g_{r,c}$ is indicative of the flat orientation, $h_f$, the TZ filter may be formed as a function of the double-subset candidate shown in Table 8, sixth row, third column, namely, a eighth flat-subset candidate, $can_{FLAT\_DBL8}$.

When the edge indicator $g_{r,c}$ is indicative of is indicative of the 45-deg orientation, $h_{45}$, the TZ filter may be formed as a function of the double-subset candidate shown in Table 8, fourth row, second column, namely, a fifth 45-dataset candidate, $can_{45\_5}$. Analogously, when the edge indicator $g_{r,c}$ is indicative of is indicative of the 135-deg orientation, $h_{135}$, the TZ filter may be formed as a function of the single-subset candidate shown in Table 8, fifth row, second column, namely, a fifth 135-dataset candidate, $can_{135\_5}$.

After selecting the single-dataset candidate or the double-dataset candidate in accordance with the edge indicator $g_{r,c}$ for the expansion pixel $119_{r,c}$, the CFA-image-processing software 140 may apply the TZ filter to obtain the first, second and third color channels for the expansion pixel $119_{r,c}$. For the $can_{H4}$, the CFA-image-processing software 140 may obtain the zoom-data point $z_{r,c}$ by applying the SZ filter as follows:

$$z_{r,c} = \frac{v_1 + v_2}{2} \quad (93)$$

where: $[v_1, v_2]$=the single-dataset candidate from the Table 8.

For the $can_{V4}$, the CFA-image-processing software 140 may obtain the zoom-data point $z_{r,c}$ by applying the SZ filter in accordance with equations the (17) and (88)-(89), where: $[v_1, v_2, v_3, v_4]$=the single-dataset candidate from the Table 8. For the $can_{45\_5}$ and $can_{135\_5}$, the CFA-image-processing software 140 may obtain the zoom-data point $z_{r,c}$ by applying the TZ filter as follows:

$$z_{r,c} = k_1 v_1 + k_2 v_2 + k_3 v_3 \quad (97)$$

where: $[v_1, v_2, v_3]$=the single-dataset candidate from Table 8.

For the $can_{FLAT\_DBL8}$, the CFA-image-processing software 140 may obtain the zoom-data point $z_{r,c}$ by applying the SZ filter in accordance with the equations (17) and (90)-(93) where: $[v_{11}, v_{12}, v_{13}, v_{14}]$=is the first of the double-dataset candidate from Table 8, and $[v_{21}, v_{22}, v_{23}, v_{24}]$=is the second of the double-dataset candidate from Table 8.

After obtaining the first, second and third color channels, the CFA-image-processing software 140 may populate the zoom-data set 160 with the zoom-data point $z_{r,c}$. This way, after performing (i) the equations (95); (ii) the equations (96) and (97) or (iii) the equations (95), (17) and (90)-(93) for each pixel of the third expanded-pixel subset, as appropriate, the zoom-data set 160 defines the first, second and third color channels for the third expanded-pixel set subset, and the orientation map 148 includes the edge indicators $g_{1,1} \ldots g_{p,q}$ for such third expanded-pixel subset.

In addition, the zoom-data set 160 defines the first-color, second-color and third-color planes. That is, each of the zoom-data points $z_{1,1} \ldots z_{p,q}$ may include contributions from each of the first, second and third color channels. The zoom-data set 160, when rendered, is colored according to all three of the color planes.

After completing the process block 602, the flow 600 may transition to termination block 604. At the termination block 604, the flow 600 may end. Alternatively, the flow 600 may be repeated periodically, in continuous fashion, or upon being triggered as a result of a condition, such as an impetus for forming one or more demosaiced images.

CONCLUSION

Variations of the method, apparatus and system described above are possible without departing from the scope of the invention. In view of the wide variety of embodiments that can be applied, it should be understood that the illustrated embodiments are exemplary only, and should not be taken as limiting the scope of the following claims. For instance, the exemplary embodiments described herein, may be embodied as methods, apparatus, electronic devices, and/or computer program products. Accordingly, such embodiments may be embodied in hardware and/or in software (including firmware, resident software, micro-code, etc.), which may be generally referred to herein as a "circuit" or "module".

Other exemplary embodiments may take forms of computer program products disposed on a computer-usable or computer-readable storage medium having computer-usable or computer-readable program code or instructions (collectively "code") embodied in the medium for use by or in connection with an instruction execution system. As used herein, the computer-usable or computer-readable medium may be any medium that can contain, store, communicate, propagate, or transport the code for use by or in connection with the instruction execution system, apparatus, or device. This code may also be stored in a computer-usable or computer-readable memory that may direct a computer or other programmable data processing apparatus to function in a particular manner, such that the code stored thereon produce an article of manufacture including code that implements the function specified in the foregoing flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium include the following: hard disks, optical storage devices, a transmission media such as those supporting the Internet or an intranet, magnetic storage devices, an electrical connection having one or more wires, a portable computer diskette, a random access memory ("RAM"), a read-only memory ("ROM"), an erasable programmable read-only memory ("EPROM or Flash memory"), an optical fiber, and a compact disc read-only memory ("CD-ROM").

The code for carrying out operations of the present invention may be written in an object oriented programming language, such as Java®, Smalltalk or C++, and the like. However, the code for carrying out operations or functions may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits ("ASICs"), or programmed Digital Signal Processors or microcontrollers.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

It will be apparent to one of ordinary skill in the art that aspects of the invention, as described above, may be implemented in many different forms of software, firmware, and hardware in the implementations illustrated in the figures. Any actual software code or specialized control hardware used to implement aspects consistent with the present invention is not limiting of the present invention. Thus, the operation and behavior of the aspects were described without reference to the specific software code or hardware logic. It should be understood that a person of ordinary skill in the art would be able to design software and control hardware to implement the aspects of the present invention based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Exemplary embodiments have been illustrated and described. Further, the claims should not be read as limited to the described order or elements unless stated to that effect. In addition, use of the term "means" in any claim is intended to invoke 35 U.S.C. §112, ¶6, and any claim without the word "means" is not so intended.

We claim:

1. A method for forming a demosaiced image from a color-filter-array image comprising a first set of pixels colored according to a first color channel, a second set of pixels colored according to a second color channel and a third set of pixels colored according to a third color channel, the method comprising:

obtaining an orientation map, the orientation map comprising, for each pixel of the color-filter-array image, an indicator of orientation of an edge bounding such pixel;

interpolating the first color channel at the second and third sets of pixels as a function of the orientation map so as to form a fourth set of pixels;

interpolating the second color channel at the first and third sets of pixels as a function of the orientation map and the fourth set of pixels; and interpolating the third color channel at the first and second sets of pixels as a function of the orientation map and the fourth set of pixels.

2. The method of claim 1, wherein the indicator of orientation of an edge is indicative of an orientation of the edge at any of a horizontal, vertical, forty-five degree, one-hundred-thirty-five degree, and a flat orientation.

3. The method of claim 1, wherein the fourth set of pixels comprises first and second subsets of pixels, wherein the first subset of pixels is colored according to the second color channel and an estimate of the first color channel, and wherein the second subset of pixels is colored according to the third color channel and an estimate of the first color channel.

4. The method of claim 1, wherein interpolating the first color channel comprises:

obtaining, from the orientation map, for at least one pixel of any of the second and third sets of pixels, an indicator of orientation of an edge bounding such at least one pixel;

selecting, as a function of the indicator of orientation, a filter for estimating the first color channel at the at least one pixel; and applying, at the at least one pixel, the filter to estimate the first color channel at such at least one pixel.

5. The method of claim 4, wherein the filter for estimating the first color channel is adapted to estimate the first color channel at the at least one pixel as a function of a gradient formed from at least one of the first set of pixels disposed in the edge bounding the at least one pixel.

6. The method of claim 1, wherein interpolating the second color channel comprises:

obtaining, from the orientation map, for at least one first pixel of the first set of pixels, a first indicator of orientation of an edge bounding such at least one first pixel;

selecting, as a function of the first indicator of orientation, a first filter for estimating the second color channel at the at least one first pixel;

applying, at the at least one first pixel, the first filter to estimate the second color channel at the at least one pixel;

obtaining, from the orientation map, for at least one second pixel of the fourth set of pixels having the third color channel and an interpolated first color channel, a second indicator of orientation of an edge bounding such at least one second pixel;

selecting, as a function of the second indicator of orientation, a second filter for estimating the second color channel at the at least one second pixel; and applying, at the at least one second pixel, the second filter to estimate the second color channel at the at least one second pixel.

7. The method of claim 6, wherein the first filter is adapted to estimate the second color channel at the at least one first pixel as a function of a first gradient formed from at least one of the fourth set of pixels disposed in the edge bounding the at least one first pixel, and wherein the second filter is adapted to estimate the second color channel at the at least one second pixel as a function of a second gradient formed from at least one of the fourth set of pixels disposed in the edge bounding the at least one second pixel.

8. The method of claim 7, wherein the fourth set of pixels comprises a subset of pixels colored according to the second color channel and an estimate of the first color channel, and wherein the first and second gradients are formed from at least one of the subset.

9. The method of claim 1, wherein interpolating the third color channel comprises:

obtaining, from the orientation map, for at least one first pixel of the first set of pixels, a first indicator of orientation of an edge bounding such at least one first pixel;

selecting, as a function of the first indicator of orientation, a first filter for estimating the third color channel at the at least one first pixel;

applying, at the at least one first pixel, the first filter to estimate the third color channel at the at least one pixel;

obtaining, from the orientation map, for at least one second pixel of the fourth set of pixels having the second color channel and an interpolated first color channel, a second indicator of orientation of an edge bounding such at least one second pixel;

selecting, as a function of the second indicator of orientation, a second filter for estimating the third color channel at the at least one second pixel; and applying, at the at least one second pixel, the second filter to estimate the third color channel at the at least one second pixel.

10. The method of claim 9, wherein the first filter is adapted to estimate the third color channel at the at least one first pixel as a function of a first gradient formed from at least one of the fourth set of pixels disposed in the edge bounding the at least one first pixel, and wherein the second filter is adapted to estimate the third color channel at the at least one second pixel as a function of a second gradient formed from at least one of the fourth set of pixels disposed in the edge bounding the at least one second pixel.

11. The method of claim 10, wherein the fourth set of pixels comprises a subset of pixels colored according to the third color channel and an estimate of the first color channel, and wherein the first and second gradients are formed from at least one of the subset.

12. The method of claim 1, further comprising: performing at least one color correction of at least one of the first, second and third color channels after interpolating the first, second and third color channels.

13. The method of claim 1, further comprising: performing a digital zoom after interpolating the first, second and third color channels.

14. A method for forming a demosaiced image from a color-filter-array image comprising a first set of pixels colored according to a first color channel, a second set of pixels colored according to a second color channel and a third set of pixels colored according to a third color channel, the method comprising: obtaining an orientation map, the orientation map comprising, for each pixel of the color-filter-array image, an indicator of orientation of an edge bounding such pixel; interpolating the first color channel at the second and third sets of pixels as a function of the orientation map so as to form a fourth set of pixels; interpolating the second color channel at the first set of pixels as a function of the orientation map and the fourth set of pixels so as to form a fifth set of pixels; interpolating the third color channel at the first set of pixels as a function of the orientation map and the fourth set of pixels so as to form a sixth set of pixels; interpolating the second color channel at the sixth set of pixels as a function of the orientation map and the fifth set of pixels; and interpolating the second color channel at the fifth set of pixels as a function of the orientation map and the sixth set of pixels.

15. The method of claim 14, wherein the indicator of orientation of an edge is indicative of an orientation of the edge at any of a horizontal, vertical, forty-five degree, one-hundred-thirty-five degree, and a flat orientation.

16. The method of claim 14, wherein the fourth set of pixels comprises first and second subsets of pixels, wherein the first subset of pixels is colored according to the second color channel and an estimate of the first color channel, and wherein the second subset of pixels is colored according to the third color channel and an estimate of the first color channel.

17. The method of claim 14, wherein interpolating the first color channel comprises:
   obtaining, from the orientation map, for at least one pixel of any of the second and third sets of pixels, an indicator of orientation of an edge bounding such at least one pixel;
   selecting, as a function of the indicator of orientation, a filter for estimating the first color channel at the at least one pixel; and
   applying, at the at least one pixel, the filter to estimate the first color channel at such at least one pixel.

18. The method of claim 14, wherein interpolating the second color channel at the first set of pixels comprises:
   obtaining, from the orientation map, for at least one pixel of the first set of pixels, an indicator of orientation of an edge bounding such at least one pixel;
   selecting, as a function of the indicator of orientation, a filter for estimating the second color channel at the at least one pixel; and
   applying, at the at least one pixel, the filter to estimate the second color channel at the at least one pixel.

19. The method of claim 14, wherein interpolating the third color channel at the first set of pixels comprises:
   obtaining, from the orientation map, for at least one pixel of the first set of pixels, an indicator of orientation of an edge bounding such at least one pixel;
   selecting, as a function of the indicator of orientation, a filter for estimating the third color channel at the at least one pixel; and
   applying, at the at least one pixel, the filter to estimate the third color channel at the at least one pixel.

20. The method of claim 14, wherein interpolating the second color channel at the sixth set of pixels comprises:
   obtaining, from the orientation map, for at least one pixel of the sixth set of pixels, an indicator of orientation of an edge bounding such at least one pixel;
   selecting, as a function of the indicator of orientation, a filter for estimating the second color channel at the at least one pixel; and
   applying, at the at least one pixel, the filter to estimate the second color channel at the at least one pixel.

21. The method of claim 14, wherein interpolating the third color channel at the fifth set of pixels comprises:
   obtaining, from the orientation map, for at least one pixel of the fifth set of pixels, an indicator of orientation of an edge bounding such at least one pixel;
   selecting, as a function of the indicator of orientation, a filter for estimating the third color channel at the at least one pixel; and
   applying, at the at least one pixel, the filter to estimate the third color channel at the at least one pixel.

22. The method of claim 14, wherein the indicator of orientation of an edge is indicative of an orientation of the edge at any of a horizontal, vertical, forty-five degree, one-hundred-thirty-five degree, and a flat orientation.

23. The method of claim 14, further comprising: performing at least one color correction of at least one of the first, second and third color channels after interpolating the first, second and third color channels.

24. The method of claim 14, further comprising: performing a digital zoom after interpolating the first, second and third color channels.

25. An apparatus for forming a demosaiced image from a color-filter-array image comprising a first set of pixels colored according to a first color channel, a second set of pixels colored according to a second color channel and a third set of pixels colored according to a third color channel, the apparatus comprising:
   memory adapted to store executable instructions to:
      obtain an orientation map, the orientation map comprising, for each pixel of the color-filter-array image, an indicator of orientation of an edge bounding such pixel;
      interpolate the first color channel at the second and third sets of pixels as a function of the orientation map so as to form a fourth set of pixels;
      interpolate the second color channel at the first and sets of pixels as a function of the orientation map and the fourth set of pixels; and
      interpolate the third color channel at the first and second sets of pixels as a function of the orientation map and the fourth set of pixels; and
   logic adapted to obtain from memory and execute the executable instructions.

26. The apparatus of claim 25, wherein the indicator of orientation of an edge is indicative of an orientation of the edge at any of a horizontal, vertical, forty-five degree, one-hundred-thirty-five degree, and a flat orientation.

27. The apparatus of claim 25, wherein the fourth set of pixels comprises first and second subsets of pixels, wherein the first subset of pixels is colored according to the second color channel and an estimate of the first color channel, and wherein the second subset of pixels is colored according to the third color channel and an estimate of the first color channel.

28. The apparatus of claim 25, wherein the executable instructions to interpolate the first color channel comprises executable instructions to:
   obtain, from the orientation map, for at least one pixel of any of the second and third sets of pixels, the indicator of orientation of an edge bounding such at least one pixel;
   select, as a function of the indicator of orientation, a filter for estimating the first color channel at the at least one pixel; and
   apply, at the at least one pixel, the filter to estimate the first color channel at such at least one pixel.

29. The apparatus of claim 25, wherein the executable instructions to interpolate the second color channel comprises executable instructions to:
   obtain, from the orientation map, for at least one first pixel of the first set of pixels, a first indicator of orientation of an edge bounding such at least one first pixel;
   select, as a function of the first indicator of orientation, a first filter for estimating the second color channel at the at least one first pixel;
   apply, at the at least one first pixel, the first filter to estimate the second color channel at the at least one pixel;
   obtain, from the orientation map, for at least one second pixel of the fourth set of pixels having the third color channel and an interpolated first color channel, a second indicator of orientation of an edge bounding such at least one second pixel;

select, as a function of the second indicator of orientation, a second filter for estimating the second color channel at the at least one second pixel; and apply, at the at least one second pixel, the second filter to estimate the second color channel at the at least one second pixel.

30. The apparatus of claim 25, wherein the executable instructions to interpolate the third color channel comprises executable instructions to:

obtain, from the orientation map, for at least one first pixel of the first set of pixels, a first indicator of orientation of an edge bounding such at least one first pixel;

select, as a function of the first indicator of orientation, a first filter for estimating the third color channel at the at least one first pixel;

apply, at the at least one first pixel, the first filter to estimate the third color channel at the at least one pixel;

obtain, from the orientation map, for at least one second pixel of the fourth set of pixels having the second color channel and an interpolated first color channel, a second indicator of orientation of an edge bounding such at least one second pixel;

select, as a function of the second indicator of orientation, a second filter for estimating the third color channel at the at least one second pixel; and apply, at the at least one second pixel, the second filter to estimate the third color channel at the at least one second pixel.

31. The apparatus of claim 25, further comprising executable instructions to: perform at least one color correction of at least one of the first, second and third color channels after interpolating the first, second and third color channels.

32. The apparatus of claim 25, further comprising executable instructions to: perform a digital zoom after interpolating the first, second and third color channels.

* * * * *